US012609039B2

(12) United States Patent
Rose et al.

(10) Patent No.: US 12,609,039 B2
(45) Date of Patent: Apr. 21, 2026

(54) SYSTEM AND METHOD FOR MODIFYING VALIDATED ROUTES FOR AN AIRCRAFT

(71) Applicant: Reliable Robotics Corporation, Mountain View, CA (US)

(72) Inventors: Robert W. Rose, Mountain View, CA (US); Michael Westenhaver, Mountain View, CA (US)

(73) Assignee: RELIABLE ROBOTICS CORPORATION, Mountain View, CA (US)

( * ) Notice: Subject to any disclaimer, the term of this patent is extended or adjusted under 35 U.S.C. 154(b) by 72 days.

(21) Appl. No.: 18/611,658

(22) Filed: Mar. 20, 2024

(65) Prior Publication Data

US 2025/0299585 A1     Sep. 25, 2025

(51) Int. Cl.
*G08G 5/55*          (2025.01)
*G05D 1/225*        (2024.01)
(Continued)

(52) U.S. Cl.
CPC .............. *G08G 5/55* (2025.01); *G05D 1/225* (2024.01); *G05D 1/46* (2024.01); *G05D 1/48* (2024.01); *G08G 5/57* (2025.01)

(58) Field of Classification Search
CPC .. G08G 5/00; G08G 5/55; G08G 5/57; G05D 1/225; G05D 1/46; G05D 1/48
(Continued)

(56) References Cited

U.S. PATENT DOCUMENTS 9,550,578 B2    1/2017  McCullough et al.
9,607,521 B2    3/2017  Coulmeau et al.
(Continued)

FOREIGN PATENT DOCUMENTS

CA        3090668 A1 *  8/2019  ............. G06N 3/045
CA        3089628 A1 *  1/2020  ............... G05D 1/46
(Continued)

OTHER PUBLICATIONS

Lindner, M., Rosenow, J. & Fricke, H. Aircraft trajectory optimization with dynamic input variables. CEAS Aeronaut J 11, 321-331 (2020).

*Primary Examiner* — Atul Trivedi
(74) *Attorney, Agent, or Firm* — Brownstein Hyatt Farber Schreck, LLP

(57)            ABSTRACT
A method may include receiving, from a ground station and at an aircraft computing system onboard the aircraft, a definition of a primary route, the primary route representing a trajectory, for the aircraft, from an origin location to a destination location, causing the aircraft to autonomously traverse the primary route using a flight controller, the flight controller configured to automatically control a set of flight control surfaces of the aircraft, while autonomously traversing the primary route, receiving an input from an inceptor, automatically mapping a direction and magnitude of the input to a predetermined flight maneuver, computing a definition of a modified route, the modified route initiating the predetermined flight maneuver, validating the modified route, including determining whether the modified route intersects known obstacles, and in response to the validation succeeding, causing the aircraft to autonomously traverse the modified route using the flight controller.

20 Claims, 21 Drawing Sheets

(51) Int. Cl.
    *G05D 1/46*        (2024.01)
    *G05D 1/48*        (2024.01)
    *G08G 5/57*        (2025.01)

(58) Field of Classification Search
    USPC ............................................................ 701/3
    See application file for complete search history.

(56) References Cited

U.S. PATENT DOCUMENTS

| | | | |
|---|---|---|---|
| 9,805,606 | B2 | 10/2017 | Coulmeau et al. |
| 9,990,854 | B1 | 6/2018 | Elmasry et al. |
| 10,026,324 | B2 | 7/2018 | Shamasundar et al. |
| 10,816,970 | B2 | 10/2020 | Bosworth et al. |
| 10,854,094 | B2 | 12/2020 | Dacre-Wright et al. |
| 11,378,988 | B2 | 7/2022 | Bosworth et al. |
| 12,347,325 | B2 * | 7/2025 | Villa ........................ G08G 5/22 |
| 2009/0319100 | A1 * | 12/2009 | Kale .......................... G08G 5/34 |
| | | | 701/4 |
| 2014/0074323 | A1 | 3/2014 | Andre et al. |
| 2017/0183105 | A1 | 6/2017 | Fournier et al. |
| 2017/0337829 | A1 * | 11/2017 | Brandao ................. G08G 5/21 |
| 2018/0052472 | A1 * | 2/2018 | Cherepinsky ........... G08G 5/74 |
| 2019/0250601 | A1 * | 8/2019 | Donahoe ................ G05D 1/101 |
| 2019/0317530 | A1 * | 10/2019 | Yang ........................ G08G 5/74 |
| 2019/0332227 | A1 | 10/2019 | Sivaratri et al. |
| 2020/0035116 | A1 | 1/2020 | Sivaratri |
| 2020/0317365 | A1 | 10/2020 | Sherry et al. |
| 2020/0372813 | A1 | 11/2020 | Smith et al. |
| 2021/0104164 | A1 * | 4/2021 | Erignac ................... G08G 5/51 |
| 2021/0134167 | A1 * | 5/2021 | Erignac ................... G08G 5/51 |
| 2021/0383703 | A1 * | 12/2021 | Venkataramana ....... G08G 5/76 |
| 2022/0028285 | A1 * | 1/2022 | Raynaud ................. G08G 5/54 |
| 2022/0106037 | A1 * | 4/2022 | Padera .................... G08G 5/34 |
| 2022/0122466 | A1 * | 4/2022 | Feyereisen .............. G08G 5/55 |
| 2022/0398930 | A1 * | 12/2022 | Plantinga ................. G08G 5/32 |
| 2022/0406198 | A1 | 12/2022 | Sacle et al. |
| 2023/0058536 | A1 | 2/2023 | Moeykens |
| 2023/0152823 | A1 * | 5/2023 | Wiegman ................. G08G 5/34 |
| 2023/0161338 | A1 * | 5/2023 | Shah ........................ G08G 5/55 |
| | | | 701/2 |
| 2023/0206774 | A1 * | 6/2023 | Boyer ...................... G08G 5/21 |
| | | | 701/18 |
| 2023/0229174 | A1 * | 7/2023 | Wiegman ............. G05D 1/0607 |
| | | | 701/8 |
| 2023/0245575 | A1 * | 8/2023 | Osipychev ............... G08G 5/25 |
| | | | 701/3 |
| 2023/0350404 | A1 * | 11/2023 | Moy .................... G05D 1/0033 |
| 2024/0013662 | A1 * | 1/2024 | Trent ....................... G08G 5/26 |
| 2024/0144835 | A1 * | 5/2024 | Burghardt ............... G01S 13/75 |
| 2024/0242617 | A1 * | 7/2024 | Rosenkranz ............ G08G 5/54 |
| 2024/0282203 | A1 * | 8/2024 | Rose ......................... G08G 5/34 |
| 2024/0317395 | A1 * | 9/2024 | Freiheit .............. B64C 29/0033 |
| 2024/0400197 | A1 * | 12/2024 | Wiegman .............. G05D 1/102 |
| 2025/0006062 | A1 * | 1/2025 | Verma ...................... G08G 5/80 |
| 2025/0157342 | A1 * | 5/2025 | Jenkins .................... G08G 5/55 |

FOREIGN PATENT DOCUMENTS

| | | | | |
|---|---|---|---|---|
| CN | 115114386 A | * | 9/2022 | ............ G06F 16/29 |
| EP | 3783454 A1 | * | 2/2021 | .......... B64C 39/024 |
| EP | 3920161 A1 | * | 12/2021 | .............. G08G 5/54 |
| EP | 3985646 A1 | * | 4/2022 | .............. G08G 5/54 |
| EP | 4047314 A2 | * | 8/2022 | .............. G08G 5/80 |
| EP | 3855269 B1 | * | 9/2023 | .......... G05D 1/0061 |
| EP | 4009128 B1 | * | 10/2023 | .............. G05D 1/81 |
| EP | 4300466 A1 | * | 1/2024 | .............. G08G 5/80 |
| EP | 4488981 A1 | * | 1/2025 | .............. G08G 5/80 |
| FR | 3144275 A1 | * | 6/2024 | .............. G08G 5/34 |
| WO | WO-2017021955 A1 | * | 2/2017 | .............. G05D 1/00 |
| WO | WO-2021013908 A1 | * | 1/2021 | .......... G06N 3/0895 |
| WO | WO-2023135202 A1 | * | 7/2023 | .............. G08G 5/80 |

* cited by examiner

500

504

510

512

506

508

1300

1310

1320

1330

COMMANDING

VOICE

TELEMETRY

VOICE

SUBSCRIPTION     SUBSCRIPTION

GROUND     ROUTING ELEMENT     AIRCRAFT

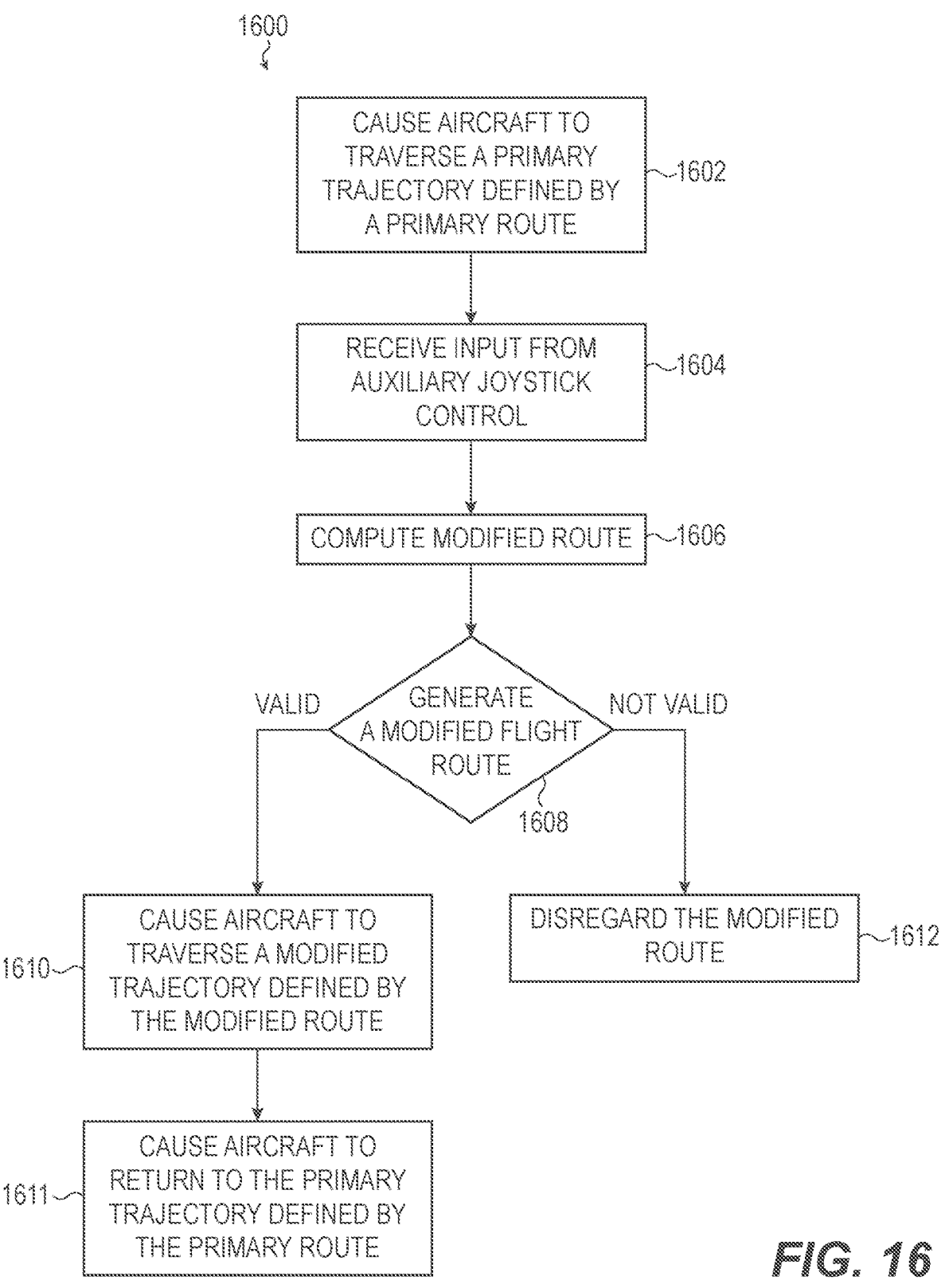

1600

CAUSE AIRCRAFT TO TRAVERSE A PRIMARY TRAJECTORY DEFINED BY A PRIMARY ROUTE ~1602

RECEIVE INPUT FROM AUXILIARY JOYSTICK CONTROL ~1604

COMPUTE MODIFIED ROUTE ~1606

GENERATE A MODIFIED FLIGHT ROUTE 1608

VALID

NOT VALID

CAUSE AIRCRAFT TO TRAVERSE A MODIFIED TRAJECTORY DEFINED BY THE MODIFIED ROUTE 1610

DISREGARD THE MODIFIED ROUTE ~1612

CAUSE AIRCRAFT TO RETURN TO THE PRIMARY TRAJECTORY DEFINED BY THE PRIMARY ROUTE 1611

*FIG. 16*

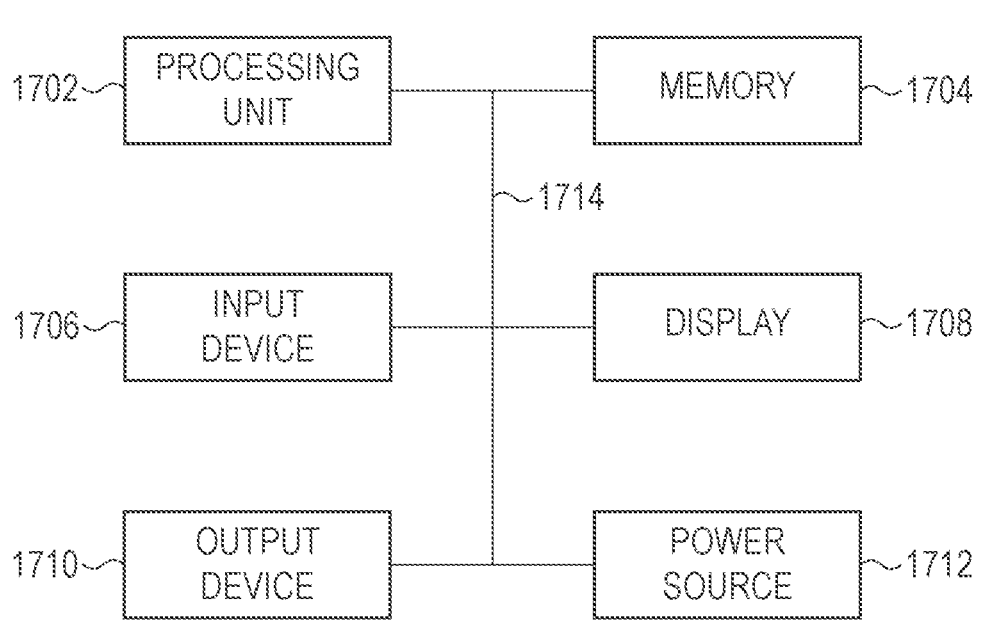
FIG. 17

SYSTEM AND METHOD FOR MODIFYING VALIDATED ROUTES FOR AN AIRCRAFT

TECHNICAL FIELD

The present disclosure is generally directed to a system for operating aircraft and, more specifically, systems and techniques for generating validated route deviations during autonomous flight operations.

BACKGROUND

Traditionally, aircraft are manually piloted by an onboard human who is able to directly operate aircraft controls and monitor flight conditions during flight. Increasingly, aircraft may include systems that facilitate autonomous flight operations. Autonomous flight may be performed with or without onboard crew. The systems and techniques described herein may allow onboard or remote aircraft operators to conveniently control certain aspects of the autonomous flight.

SUMMARY

A method of autonomous flight for an aircraft may include receiving, from a ground station and at an aircraft computing system onboard the aircraft, a primary route, the primary route defining a primary trajectory, for the aircraft, from an origin location to a destination location. The method may further include causing the aircraft to autonomously traverse the primary trajectory defined by the primary route using a flight controller, the flight controller configured to automatically control a set of flight control surfaces of the aircraft. The method may further include, while the aircraft is autonomously traversing the primary trajectory, receiving an input from an inceptor, the input including a direction and a magnitude, automatically mapping the direction and magnitude of the input to a predetermined flight maneuver, computing a modified route, the modified route initiating the predetermined flight maneuver at a first location in the primary route and resuming a portion of the primary route at a second location in the primary route, the modified route defining a modified trajectory for the aircraft, validating the modified route, including determining whether the modified route intersects known obstacles, in response to the validation of the modified route failing, disregarding the input from the inceptor and maintaining the primary route, and in response to the validation of the modified route succeeding, causing the aircraft to autonomously traverse the modified trajectory using the flight controller.

A direction of the predetermined flight maneuver may correspond to the direction of the input, and a distance of the predetermined flight maneuver may correspond to the magnitude of the input. The predetermined flight maneuver may correspond to a turn, a direction of the turn may be defined by the direction of the input, and a radius of the turn may be defined by the magnitude of the input. The turn may be a constant radius turn. The predetermined flight maneuver may correspond to a change in altitude, a direction of the change in altitude may be defined by the direction of the input, and a climb rate may be defined by the magnitude of the input.

The modified route may be a first modified route, the modified trajectory may be a first modified trajectory, the input may be a first input, and the method may further include while the aircraft is autonomously traversing the first modified trajectory, receiving a second input from the inceptor, the second input corresponding to the inceptor being returned to a neutral position, computing a second modified route corresponding to straight and level flight, the second modified route defining a second modified trajectory for the aircraft, validating the second modified route, including determining whether the second modified route intersects known obstacles, in response to the validation of the second modified route failing, disregarding the second input from the inceptor and maintaining the first modified route, and in response to the validation of the second modified route succeeding, causing the aircraft to autonomously traverse the second modified trajectory using the flight controller. The method may further include, while the aircraft is autonomously traversing the second modified trajectory and in accordance with a determination that no manipulations of the inceptor are detected for a time duration, generating a third modified route corresponding to a return to the primary route, the third modified route defining a third modified trajectory for the aircraft, validating the third modified route, including determining whether the third modified route intersects known obstacles, in response to the validation of the third modified route failing, maintaining the second modified route, and in response to the validation of the third modified route succeeding, causing the aircraft to autonomously traverse the third modified trajectory using the flight controller.

A method may include, at a route generation system onboard an aircraft and configured to generate validated routes for autonomous flight, while an aircraft is autonomously traversing a primary trajectory from an origin location to a destination location, the primary trajectory defined by a primary route receiving an input from an inceptor, the input including a direction and a magnitude, automatically mapping the direction and magnitude of the input to a predetermined flight maneuver, computing a modified route, the modified route initiating the predetermined flight maneuver at a first location in the primary route and resuming a portion of the primary route at a second location in the primary route, the modified route defining a modified trajectory for the aircraft, validating the modified route, including determining whether the modified route intersects known obstacles, in response to the validation of the modified route failing, disregarding the input from the inceptor and maintaining the primary route, and in response to the validation of the modified route succeeding, causing the aircraft to autonomously traverse the modified trajectory using a flight controller, wherein the flight controller may be configured to manipulate a propulsion system of the aircraft and a flight control surface of the aircraft in order to autonomously traverse the modified trajectory.

The predetermined flight maneuver may include a constant radius turn, and the flight controller may be configured to adjust a bank angle of the aircraft to maintain the constant radius turn while traversing the modified route. The predetermined flight maneuver may include a 360 degree turn having a radius that corresponds to the magnitude of the input, and validating the modified route includes determining whether the aircraft can perform the 360 degree without intersecting known obstacles. The modified route may fail the validation if the modified route intersects a known obstacle. Validating the modified route may include determining whether the aircraft is capable of traversing the modified trajectory under current environmental conditions. The method may further include, after traversing at least a portion of the modified trajectory, causing the aircraft to return to the primary trajectory.

The modified route may be a first modified route, the modified trajectory may be a first modified trajectory, the input may be a first input, and the method may further include while the aircraft is autonomously traversing the first modified trajectory, receiving a second input from the inceptor, the second input corresponding to the inceptor being returned to a neutral position, computing a second modified route corresponding to straight and level flight, the second modified route defining a second modified trajectory for the aircraft, validating the second modified route, including determining whether the second modified route intersects known obstacles, in response to the validation of the second modified route failing, disregarding the second input from the inceptor and maintaining the first modified route, and in response to the validation of the second modified route succeeding, causing the aircraft to autonomously traverse the second modified trajectory using the flight controller.

An aircraft may include a propulsion system, a set of flight control surfaces, a flight controller operatively coupled to the propulsion system and the set of flight control surfaces, an inceptor, and an aircraft computing system configured to receive, from a ground station, a primary route, the primary route defining a primary trajectory, for the aircraft, from an origin location to a destination location, cause the aircraft to autonomously traverse the primary trajectory using the flight controller, the flight controller configured to automatically control the set of flight control surfaces of the aircraft and the propulsion system of the aircraft to traverse the primary trajectory, while the aircraft is autonomously traversing the primary trajectory, receive an input from the inceptor, the input including a direction and a magnitude, automatically map the direction and magnitude of the input to a predetermined flight maneuver, compute a modified route, the modified route initiating the predetermined flight maneuver at a first location in the primary route and resuming a portion of the primary route at a second location in the primary route, the modified route defining a modified trajectory for the aircraft, validate the modified route, including determining whether the modified route intersects known obstacles, in response to the validation of the modified route failing, disregard the input from the inceptor and maintain the primary route, and in response to the validation of the modified route succeeding, cause the aircraft to autonomously traverse the modified trajectory using the flight controller.

The inceptor may include a base and a stick member movable relative to the base, and the stick member may be movable between a neutral position and a set of deflection positions, wherein a first deflection position of the set of deflection positions may be associated with a first manipulation distance and first tactile feedback, and a second deflection position of the set of deflection positions may be associated with a second manipulation distance and second tactile feedback. The inceptor may include a haptic actuator and the haptic actuator may produce the first tactile feedback and the second tactile feedback. The first deflection position may correspond to a request to execute a first predetermined flight maneuver corresponding to a first turn having a first radius, and the second deflection position may correspond to a request to execute a second predetermined flight maneuver corresponding to a second turn having a second radius that is smaller than the first radius.

The set of deflection positions may correspond to a set of first deflection positions in a first direction relative to the neutral position, and the stick member may be movable between the neutral position and a set of second deflection positions in a second direction relative to the neutral position, the second direction different from the first direction. The set of second deflection positions may include a third deflection position corresponding to a request to execute a third predetermined flight maneuver corresponding to a first climb at a first climb rate, and a fourth deflection position may correspond to a request to execute a fourth predetermined flight maneuver corresponding to a second climb at a second climb rate different from the first climb rate.

BRIEF DESCRIPTION OF THE DRAWINGS

FIG. 16 depicts a flow chart of an example operation for generating a modified and traversing a trajectory defined by the modified route.

FIG. 17 depicts an example electronic device.

Figure 1:
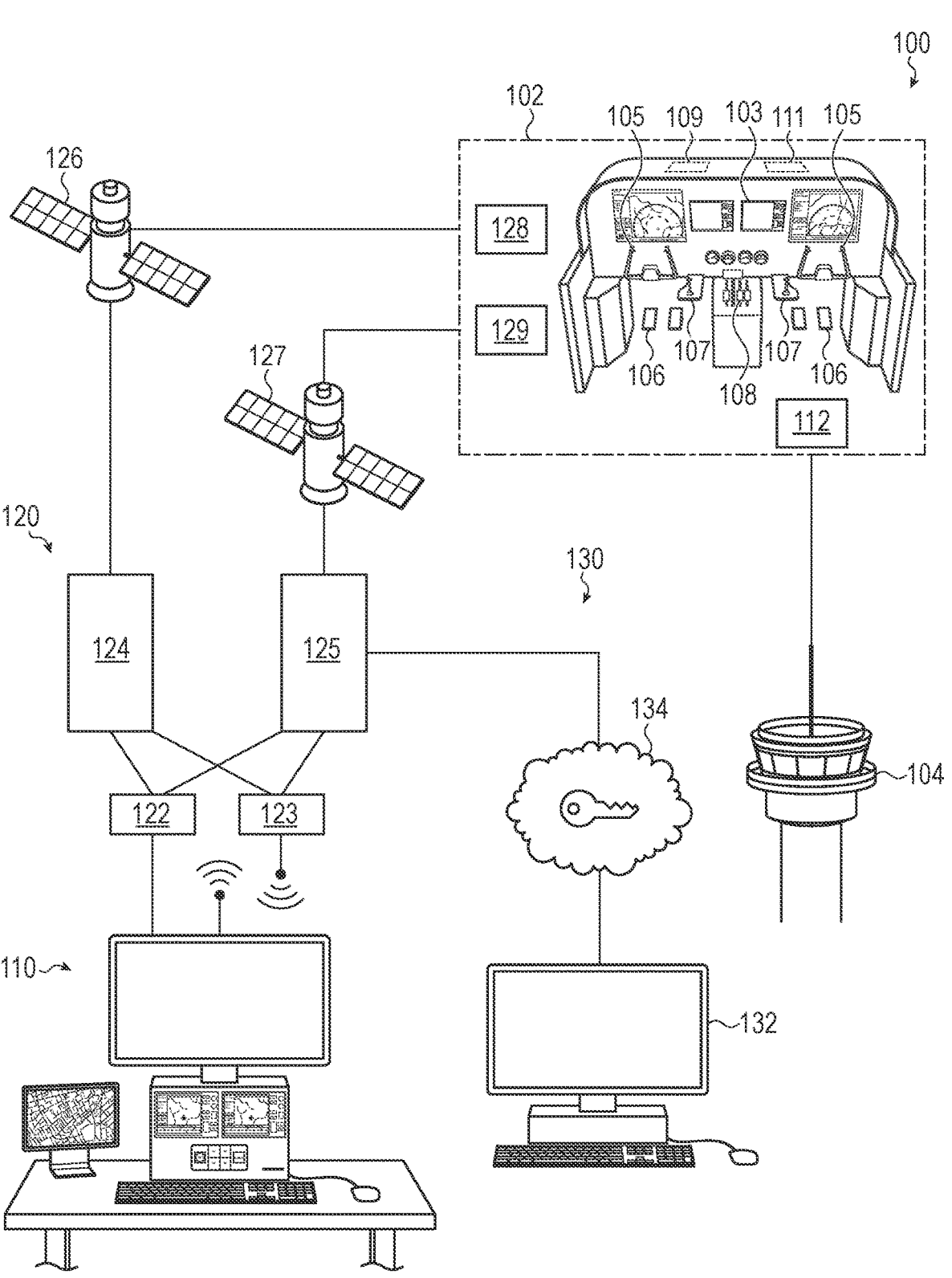
FIG. 1 depicts an example aircraft operation system.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for simplified control of an aircraft during autonomous flight operations. Autonomous flight operations may include an aircraft automatically following or traversing a validated route (e.g., without real-time pilot control). A validated route may define a path or trajectory (e.g., the complete trajectory through three-dimensional space) between an origin and a destination, and which satisfies one or more validation criteria. The validation criteria may include, for example, a requirement that the route does not intersect any known obstacles (e.g., no collisions with terrain, buildings, etc.), a requirement that the route meets any applicable regulations, laws, or other guidelines, or a requirement that the route does not encounter known or predicted weather conditions. Other criteria and/or combinations of criteria are also contemplated.

The validated route may define or incorporate various flight parameters, including the particular trajectory to be traversed (including altitude), the aircraft speed along the route, route waypoints and associated arrival times, aircraft attitude or other maneuvers, takeoff and landing operations, and the like. In some cases, a validated route may provide all of the information necessary for the aircraft to autonomously traverse the route (and/or the trajectory defined by the route). Thus, validated routes may provide a basis for safe and efficient autonomous flight operations.

While traversing a validated route, which may be referred to as a primary route, the aircraft may autonomously control any and all necessary aircraft systems to maintain the aircraft on the validated route. For example, the aircraft may control the propulsion system and flight control surfaces to keep the aircraft at the target time and location values defined by the validated route. Such autonomous flight operations may be performed by an uncrewed aircraft, or by an aircraft with an onboard operator.

In some cases, an onboard (or remote) operator, who is not manually flying the aircraft, may wish to deviate from the validated primary route. For example, an operator may want to observe a point of interest on the ground, or may otherwise want to temporarily deviate from the validated primary route. While a pilot could simply take manual control of the aircraft, this may be contrary to the purpose of using autonomous flight to traverse a validated route. In particular, under manual control, the aircraft is no longer following a route that has been validated to meet certain safety and/or operational criteria. Accordingly, described herein are systems and methods that allow an operator to quickly and intuitively (and in real-time) propose deviations from the validated primary route by providing physical inputs that mimic or resemble flight control inputs, but which actually result in new, validated routes (or route segments) that are autonomously traversed rather than manually flown. For example, an aircraft (or a ground station) may include an inceptor, which may resemble a joystick or other manipulatable input mechanism and may accept directional inputs from a user (e.g., pivot left, right, forward, and aft). Instead of controlling the flight control surfaces of the aircraft directly, an input to the inceptor may cause a route management system to automatically compute a modified route (which includes a deviation from the primary route), which is then evaluated by the route management system to ensure that it meets the validation criteria for an autonomously traversable route. If the modified route generated by the route management system is successfully validated, the aircraft may autonomously traverse the modified route. If the proposed modified route is not validated (e.g., the validation fails), the aircraft may disregard or reject the modified route and remain on its primary route. Thus, the operator can initiate route deviations via an intuitive directional input, without losing the safety and oversight of the route validation and the autonomous control of the aircraft. Stated another way, while the directional input may appear to directly control the flight control systems of the aircraft, it actually causes a new modified route to be generated, validated, and autonomously traversed.

The directional input may produce a limited set of predetermined flight maneuvers. For example, a directional input to the left or right may initiate a constant radius turn at a constant altitude, and a directional input fore or aft may initiate a climb or descent. The direction and the distance of the movement of the inceptor may define the particular type of predefined maneuver that is requested, as well as certain parameters of the maneuver. For example, a left/right stick movement may correspond to a turn in the direction of the movement, and the distance of the movement may correspond to a desired radius for the turn. A fore/aft stick movement may correspond to a change in altitude, and the distance of the movement may correspond to a desired climb rate (which may be positive, indicating an ascent, or negative, indicating a descent). Because the parameters of the predetermined flight maneuver are defined by the distance of the input movement, the system allows fast and intuitive modifications to the primary route while also maintaining the integrity of the route validation system and autonomous flight operations. Moreover, such a system may enable operators who are not trained pilots to easily and safely deviate from primary routes mid-flight. More broadly, the systems and methods described herein facilitate flight operations in which all aircraft trajectories and routes, including route deviations received from an onboard operator in real-time during flight, are fully validated prior to execution, and the flight control systems of the aircraft remain under the control authority of the onboard flight controller(s) that causes the aircraft to traverse the routes.

Also described herein are techniques for returning an aircraft to a primary route after a deviation has been executed. For example, if a turn is initiated via the inceptor, and then the inceptor is returned to a neutral position, the aircraft may return to straight and level flight (assuming that trajectory is validated), and, after a certain time passes with no further inputs to the inceptor, the aircraft may validate and execute a trajectory to autonomously return the aircraft to the primary route.

These and other aspects of the system are described below with respect to the example embodiments depicted in FIGS. 1-16.

FIG. 1 depicts an example system with an aircraft, which may be crewed or uncrewed, and a ground station, which may be operated by a remote pilot or other operator. Specifically, FIG. 1 depicts an aircraft operation system 100 that includes an aircraft 102 that may be remotely piloted or remotely monitored or controlled by a ground station 110, or which may include onboard crew or operators. As described herein, the aircraft 102 may operate in an autonomous flight mode even when onboard crew is present, and the aircraft 102 may allow the onboard crew to propose modifications or deviations to the validated route, which are then validated and executed by the aircraft 102 using its autonomous flight capabilities and systems.

The ground station 110 may also be referred to as a terminal device, remote terminal, remote control station, ground-based controller, ground-based facility, or simply a controller. Communications between the ground station 110 and the aircraft 102 may be conducted using a communication network 120 having various network elements, described herein. The communications may also be conducted in conjunction with a security system 130, which may be partially or wholly integrated with the communication network 120. The system 100 may also include additional elements including an air traffic control (ATC) facility 104, other ground-based systems, and other aircraft (crewed and uncrewed). The aircraft 102 may communicate with the ATC facility 104 using a radio-frequency (RF) communication module 112, which may include an RF transceiver and other communications electronics configured for wireless communications with an ATC facility 104, other aircraft, or other external devices.

As described herein, the aircraft 102 may be an airplane, rotorcraft, powered lift, glider, lighter-than-air craft, or other current or future category of aircraft. The aircraft 102 may be adapted for cargo or non-passenger service or, alternatively, may be adapted to carry one or more human passengers or both human and cargo service. The aircraft 102 may be configured for (or may be modified or retrofitted to enable) fully autonomous, semi-autonomous, and/or manually operated flight modes, and may be configured for uncrewed flight, remotely operated or monitored flight, or crewed flight.

In the present example, the aircraft 102 is a fixed-wing powered airplane, though this is merely for explanation, and the concepts described herein may be applied to other types of aircraft, as described above. The aircraft 102 is equipped with a flight controller 109 and controls that are configured to operate the propulsion system and various flight control surfaces of the aircraft 102 such as ailerons, an elevator, a rudder, flaps, spoilers, slats, and air brakes. The flight controller 109 may also be configured to control the aircraft propulsion system including, without limitation, piston propeller engines, turboprop engines, turbojet engines, turbofan engines, or ramjet engines. The flight controller 109 may also be adapted to control ground or land-based operations including taxiing, parking, and other pre-flight and post-flight maneuvers as well as operate various subsystems including, for example, an auxiliary power unit, cabin environmental controls, fuel system controls, anti-icing equipment, and security systems. The flight controller 109 may receive or otherwise access validated routes, and operate the onboard systems (e.g., propulsion, flight control surfaces, landing gear, flaps, air brakes, wheel brakes, etc.) to cause the aircraft 102 to traverse a validated route. Routes that are used by the flight controller 109 may include any suitable data and/or data structures that ultimately allow the flight controller 109 to cause the aircraft to traverse the trajectory defined by the validated route. For example, routes may include mathematical functions that define a path through three-dimensional space (the path for the aircraft to traverse); point sets that include a series of discrete target points that together define a path through three-dimensional space; a continuous path defined by a series of straight segments and curved segments (as defined by mathematical and/or geometric functions); speed setpoints along the path; acceleration setpoints along the path; and the like. More generally, the route may include any data, data structures, setpoints, parameters, or other information that a flight controller needs in order to cause the aircraft to traverse a trajectory defined by the route. Because a route defines or includes a trajectory (among other possible data or flight specifications), an aircraft may be said to traverse a trajectory or traverse a route. It will be understood that an aircraft traversing a route corresponds to an aircraft traversing a trajectory that is defined by the route. Moreover, a trajectory may define a path, through three-dimensional space, between any two locations (including between airports, between two locations in air, between a location on land and a location in the air, etc.). Thus, trajectories may refer to portions or segments of a full path that is traversed by an aircraft during a mission or a complete flight.

The aircraft 102 may include flight controls that allow an onboard pilot to manually fly the aircraft. For example, the aircraft 102 may include a yoke 105 (or other control system, such as a control stick) that controls one or more flight control surfaces of the aircraft, rudder pedals 106, throttle controls 108, as well as other controls that facilitate manual control of the aircraft.

The flight controller 109 may control the various systems of the aircraft either through motorized or adapted versions of human operated controls, through dedicated control mechanisms, or a combination of the two. In some cases, the aircraft 102 is equipped with redundant electro-mechanical systems for each control operation and may include various other systems to ensure safe and reliable operation of the aircraft. The flight controller 109 may also be operably coupled to various sensors including, without limitation, airspeed sensors, temperature sensors, altimeters, global positioning system (GPS) sensors, accelerometers, tilt sensors, radar sensors, LiDAR sensors, and cameras, which may provide feedback for closed-loop control operations for various aircraft functions and/or operations.

Figure 12:
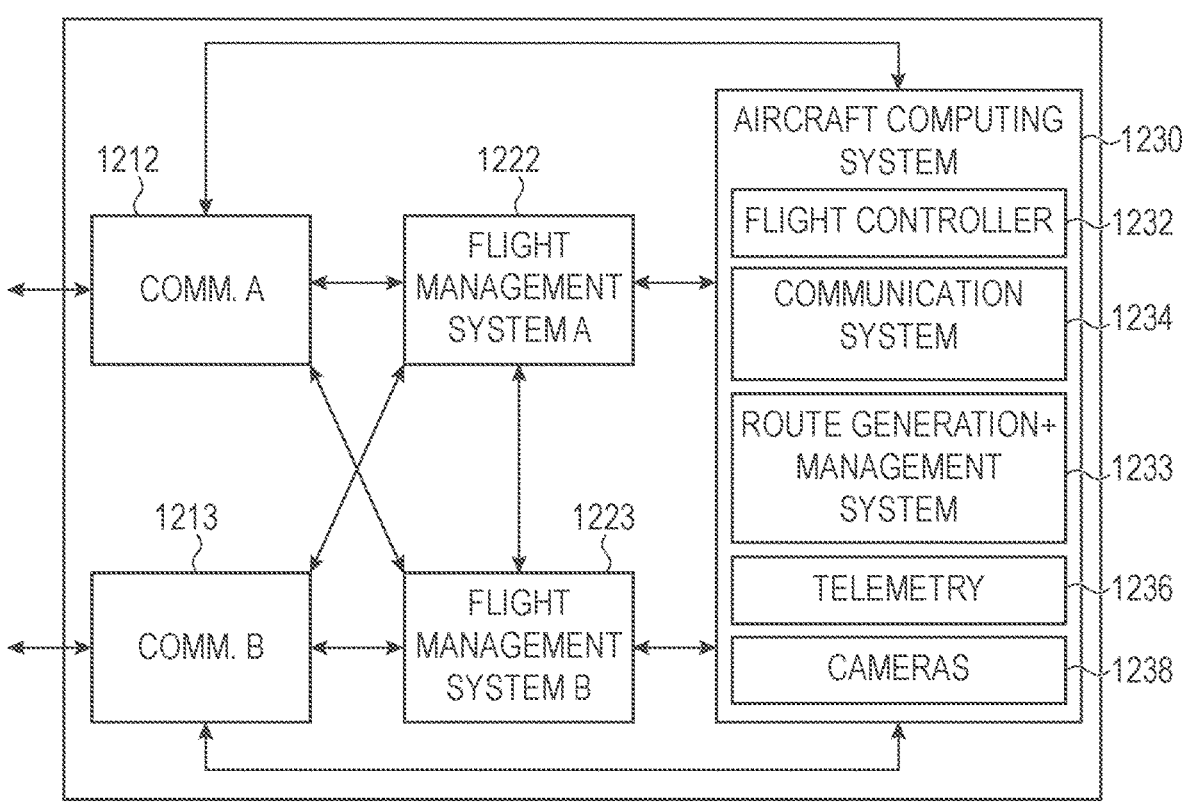
FIG. 12 depicts a schematic of an example onboard system of an aircraft.

The flight controller 109 may be configured to control various systems of the aircraft 102 to cause the aircraft to traverse validated routes. In particular, the flight controller 109 may receive or access a validated route, and operate the aircraft systems to fly the aircraft along the validated route. The flight controller 109 may determine how to control the aircraft 102 in order to traverse the route, including determining throttle settings, flight control surface manipulations, flap settings, landing gear settings, brake settings, and any other aircraft functions. Thus, the route may indicate the trajectory to be flown (and may define the target position of the aircraft along the trajectory as a function of time), and the flight controller 109 may determine how to operate the aircraft 102 to traverse the route. In some cases, the flight controller 109 may operate the aircraft 102 in order to traverse a route that is active in a route generation and management system 111 (or another component or system of an aircraft computing system more generally, such as the aircraft computing system 1230). The flight controller 109 may also execute ground-based operations, such as taxiing, takeoff, landing, etc. The flight controller 109 may be implemented by one or more computer systems. In some cases, the flight controller 109 may be a standalone computing system that interfaces with other computing systems on an aircraft (e.g., the RGMS 111, the flight management systems 103, etc.). In some cases, the flight controller 109 may be integrated with or instantiated by other computing systems of the aircraft, such as the aircraft computing system 1230 (FIG. 12).

As described herein, the flight controller 109 may also operate the aircraft 102 in order to traverse modified routes, which may include traversing certain predefined maneuvers, such as a constant radius turn or a constant rate ascent/descent. In both cases, the flight controller 109 may control numerous aircraft systems to execute the maneuver, including responding to changing weather and wind conditions, accounting for turbulence, and the like. For example, because a validated route or validated route deviation may define the position of the aircraft with respect to time (rather than particular flight control surface manipulations), the flight controller 109 may be configured to control the aircraft's flight systems in order to traverse the validated routes. Thus, for example, in a constant radius turn, the flight controller 109 may adjust multiple aircraft systems to maintain the constant radius turn, including adjusting bank angle (e.g., to maintain a constant radius in changing wind conditions), adjusting a yaw rate, and the like.

The aircraft 102 may also include a route generation and management system (RGMS) 111. The RGMS 111 may generate, manage, and validate routes for the aircraft 102.

The RGMS 111 may interface with the flight controller 109 and/or the flight management system 103 of the aircraft to provide validated routes and/or cause the aircraft 102 to traverse the validated routes. The RGMS 111 may also receive information from an inceptor 107 and interpret the information as a proposal to modify a route in a certain way. The RGMS 111 may validate the modified routes and cause the aircraft 102 to traverse the modified routes. The RGMS 111 may be replicated in a ground based RGMS, which may provide redundancy to the onboard RGMS 111. The RGMS 111 may be implemented by one or more computer systems. In some cases, the RGMS 111 may be a standalone computing system that interfaces with other computing systems on an aircraft (e.g., the flight controller 109, the flight management systems 103, etc.). In some cases, the RGMS 111 may be integrated with or instantiated by other computing systems of the aircraft, such as the aircraft computing system 1230 (FIG. 12).

The aircraft 102 may also include an inceptor 107 that receives user manipulations and, in response to the manipulations, provides signals to the RGMS 111 (or another RGMS or other computing system associated with the aircraft 102) that are indicative of proposed deviations from a primary route. The inceptor 107 may resemble a joystick or other manipulatable input member and may be movable between a neutral position (e.g., a centered position) and one or more deflected positions. The deflected positions may include deflections in various different directions and various different distances (e.g., fore/aft and left/right). As described herein, when a manipulation of the inceptor 107 is detected, parameters of the manipulation (e.g., a manipulation direction and manipulation distance) may be mapped to predetermined flight maneuvers that deviate from a validated primary route (or any other route the aircraft is currently traversing). For example, a manipulation in a left/right direction (also referred to herein as a lateral direction) may map to a flight maneuver that includes a turn away from the primary route (where the direction of the turn and turn radius are defined by the direction and distance of the manipulation). As another example, a manipulation in a fore/aft direction may map to a flight maneuver that includes an ascent or descent relative to the primary route (where climb direction and the rate of climb are defined by the direction and distance of the manipulation). The predetermined flight maneuvers that a given inceptor input may be mapped to may be used to compute modified routes that include the predetermined flight maneuvers.

The inceptor 107 may also include systems that provide tactile feedback to a user. For example, the inceptor 107 may produce tactile feedback at deflection positions that are associated with different route parameters. For example, tactile feedback may be provided at several lateral positions to indicate a radius of a proposed turn (e.g., a first tactile output may be felt at a first deflection position, which results in a proposed turn having a one mile radius; a second tactile output may be felt at a second deflection position, which results in a proposed turn having a 0.5 mile radius; etc.), and at several fore/aft positions to indicate a climb rate of a proposed ascent/descent. The tactile feedback systems may include physical detents, a haptic actuator, a friction brake, or any other suitable tactile output system. Further details of an example inceptor and its operation are described herein with respect to FIG. 11.

The inceptor 107 may be operationally coupled to the RGMS 111, which may interpret the signals from the inceptor 107 as proposals for modified routes (e.g., including the predetermined flight maneuver to which an input maps) and validate the proposed modified routes. If validated, the RGMS 111 causes the aircraft 102 to traverse the modified route (e.g., by providing the modified route to the flight controller 109 of the aircraft).

The aircraft 102 may also include a flight management system 103. The flight management system 103 may be designed to receive, store, and provide visualizations of flight plans. Flight plans may define aspects of a planned or upcoming flight, such as an origin location or airport, a destination location or airport, trip waypoints, altitude targets, and the like. In general, a flight plan as input to and stored in a flight management system 103 may not fully define a three-dimensional trajectory of the aircraft. Rather, validated routes may be generated based at least in part on a flight plan from a flight management system 103, as described herein. The validated routes may define the three-dimensional trajectory of the aircraft, and a flight controller may be configured to the validated route to determine how to control the aircraft's various flight control systems in order to traverse the route.

The flight management system 103 may be a redundant version of ground-based flight management systems (described with respect to FIGS. 2-3, for example), and may provide the same general functionality as the ground-based flight management systems. The flight management system 103 may also include input and output systems (e.g., a display, buttons, a touch screen, etc.) to allow an operator to enter flight plans, view flight plans, modify flight plans, and the like.

As described herein, the RGMS 111 may generate and validate routes (e.g., primary and/or modified routes) and provide routes to the flight controller 109. The flight controller 109 may maintain only a single route as the active or current route at any given time. Accordingly, when the RGMS 111 modifies a route (e.g., in response to input from an inceptor), the RGMS 111 provides the modified validated route to the flight controller 109, which causes the aircraft to traverse the modified route in real time.

In some cases, a primary route may be received at the aircraft (e.g., at the RGMS 111, the flight controller 109, or an aircraft computing system more generally) from a ground station, as described herein. For example, a flight plan may be input into a flight management system that is located at a ground station. An RGMS, which may also be located at the ground station or otherwise communicatively coupled to the flight management system, may access the flight plan and develop a route that satisfies the flight plan. As described herein, the flight plan may specify certain aspects of a flight, such as the origin location (e.g., airport), destination location (e.g., airport), waypoints, and the like, but may not itself define a precise three-dimensional route or path for the aircraft. Accordingly, the RGMS may develop a route that satisfies all of the requirements of the flight plan and provides a precise specification of the proposed path or trajectory of the aircraft. The route may be the basis for a flight controller to execute a fully autonomous flight along the route. For example, the flight controller 109 may receive and/or access a route, and manipulate the various aircraft's systems (e.g., flight control surfaces, engines, landing gear, etc.) in order to cause the aircraft to traverse the route.

As noted, the route generated by an RGMS may define or specify the trajectory of an aircraft through multiple stages of its flight, including, for example, ground-based maneuvers, take-off maneuvers, flight maneuvers, landing maneuvers, etc. For turns during flight, the route may define or specify the location where a turn is initiated, the turn radius (which may be constant or variable), and the duration or distance of the turn. For changes in altitude, the route may define or specify the rate of change of altitude, the location where altitude changes are initiated and concluded, and the like. For ground-based maneuvers, the route may define or specify the precise route, along the ground, from a starting location to the takeoff point (including the taxiing route). As described herein, the RGMS or other suitable system may validate the route, which may include, for example, determining that the flight plan is safe (according to one or more safety criteria), and that the aircraft is capable of executing the flight plan (e.g., the flight plan is fully within the aircraft's operational envelope).

Once a validated route is generated, it may be sent to the aircraft via one or more communications channels as described herein. (In some cases, a validated route may be generated onboard an aircraft, such as by an onboard RGMS generating a route based on a flight plan stored in an onboard flight management system.) The primary route may be received at an aircraft computing system onboard the aircraft, and may be loaded into a memory of the RGMS 111 on the aircraft. The aircraft may then autonomously traverse the primary route, such as by providing the primary route to the flight controller 109 or otherwise providing instructions to the flight controller 109 that allow it to autonomously operate the aircraft to traverse the primary route.

In some cases, a modified flight plan may be input into a flight management system (and/or a flight plan that is currently stored and/or active in a flight management system may be modified). In such cases, the RGMS may access the modified flight plan (optionally during an ongoing autonomous flight that is traversing a primary route) and generate a new validated route for the aircraft to follow. In such cases, the new validated route may overlap the primary route (e.g., a terminal portion of the primary route may overlap an initial portion of the new route) such that the aircraft can begin to traverse the new route without disruption in aircraft operations.

The aircraft operation system 100 may include various computing systems and associated applications that facilitate autonomous flight operations. The aircraft operation system 100 may include computing systems such as the flight management controllers (both aircraft- and ground-based), route generation and management systems (both aircraft- and ground-based), and/or other computing systems. In some cases, operations are shared among multiple computing systems. In some cases, the computing systems may include redundancies. For example, the flight management system 103 and the flight management systems 212, 213 (FIG. 2) at a ground station 110 may each be configured to perform the same operations, and may share data, results, operational states, or other information between them in order to provide the functions and/or operations of the flight management systems. Similarly, the RGMS 111 and a ground-based RGMS may each be configured to perform the same operations, and may share data, results, operational states, or other information between them in order to provide the functions and/or operations of the RGMS.

Returning to FIG. 1, the communication network 120 and the described operation of the communication network 120 may provide several advantages including the ability to operate the aircraft 102 over a potentially large geographical area and utilize network elements that are accessible from a variety of locations. As shown in FIG. 1, the communication network 120 includes internet-service provider interfaces 122, 123, which are operably coupled to or integrated with the ground station 110. The communication network 120 also includes one or more communication routing elements 124, 125, which may include systems and hardware that are accessible over a public network like the Internet. The communication network 120 also includes one or more satellite sub-systems 126, 127, which are adapted to relay communications from ground-based elements to one or more communication interfaces 128, 129 onboard the aircraft 102.

The communication network 120 may leverage existing network hardware elements and also enable the ground station 110 to be operated from a variety of locations and in a variety of conditions. The communication network 120 may also provide more consistent and reliable communication links that are relatively unaffected by geographic topology, weather, and other factors that may interfere with some traditional communication schemes. The communication network 120 alone or in combination with the security system 130 may provide reliability that meets or exceeds regulatory requirements specified by the Federal Aviation Administration (FAA) or other regulatory authority. The described systems and techniques may also help to ensure the safe and robust operation of the aircraft 102 even while the operation of individual network elements may falter or become unreliable.

Described in more detail below with respect to FIG. 15, the security system 130 may include a cloud-based registry 134, which may be used to maintain a list of authenticated users (authorized pilots) and registered components (e.g., ground stations and aircraft), which may be referenced by the routing elements 124, 125 during operations. The security system 130 may be maintained and/or adapted by a security administrator 132. The security administrator 132 may be a separate device or, in some implementations, be integrated with the ground station 110.

Each of the subsystems operated on board the aircraft 102 may be relayed to the ground station 110 by the communication network 120. In the present example, the aircraft 102 relays signals to the ground station 110 via satellite subsystems 126, 127 and network routing elements 124, 125 that may conduct communications using a digital or network communication scheme. Specifically, data may be transmitted from the aircraft 102 to the satellite subsystems 126, 127 via an uplink channel, which may transmit uplink data packets. Similarly, data may be received from the satellite subsystems 126, 127 via a downlink channel, which may transmit downlink data packets. The uplink channel and downlink channel may be operated by one or more interfaces 128, 129, which may include one or more onboard transceivers configured to conduct wireless communications with the satellite using an established procedure and frequency band. In some cases, the uplink channel and downlink channel are operated over a common or shared network layer, data link layer, and/or physical communication layer. The transceiver(s) of the interfaces 128, 129 may be adapted to conduct Ka-band communications (26-40 GHz), Ku-band communications (12-18 GHz), X-band communications (8-12 GHz), C-band communications (4-8 G Hz), S-band communications (2-4 GHZ), L-band communications (1-2 GHz), or other established communication bands.

Similarly, other elements of the communication network 120 and the ground station 110 may conduct communications with the satellite subsystems 126, 127 through uplink and downlink channels, which may transmit data packets or other digital communications. Similar to the aircraft-side of the satellite communication scheme, the uplink channel and downlink channel may operate over a shared network layer, data link layer, and/or physical communication layer. Other elements of the communication network 120 including the routing elements 124, 125 may be coupled to the satellite subsystems 126, 127 via a satellite service provider that is operably coupled to the other elements of the communication network 120 over a computer network like the Internet. For purposes of the current examples and explanation, the satellite subsystems 126, 127 may include a terrestrial transmission station, which may be operated by a third party.

The data communication packets of the communication system 120 may be generated in accordance with an established communications protocol. For example, the data communication packets may be generated in accordance with a Real-time Transport Protocol (RTP), which may include Real Time Communications (RTC) such as WebRTC protocols enabled through a web browser, Real-Time Messaging Protocols (RTMP), Real-Time Streaming Protocols (RTSP), and other similar protocols. Other protocols may include HTTP live streaming (HLS) protocols like Low Latency HLS or other similar streaming communication schemes. These and other protocols may also be broadly characterized as Voice Over Internet Protocol (VOIP) in which analog voice communications are converted to digital data objects and transported via an Internet Protocol (IP) communication system. While framed or packeted communication schemes may be used, it is not necessary to use either framed or IP communication schemes for the data communication packets of the communication network 120.

As described herein, the system 100 may utilize the same uplink/downlink communication channels for transmitting flight control information, sensor readings, images, video feeds, or perform other data exchanges between the ground station 110 and the aircraft 102. In some cases, some or all of these data exchanges are performed on a separate communication channel that is routed through the communication network 120. If the aircraft 102 is predicted to be in reliable communication using another wireless communication network, some or all of the above-referenced data exchanges or voice communications may be, at least temporarily, conducted through another non-satellite wireless communication network.

As described herein, the communication network 120 may utilize redundant system elements, which may be used in parallel data packet transmission operations as well as fail-over alternative paths when one or more network elements become inoperable or unreliable. Specifically, the proposed system includes redundant internet provider interfaces 122, 123, which may be operated by distinct or separate providers. In some cases, one of the interfaces 122 is provided via a wired communication channel and the other interface 123 is provided via a wireless channel (e.g., 4G and/or 5G wireless communications). Each of the interfaces 122, 123 may be operably coupled to each of the routing elements 124, 125 creating a redundant and alternative path for communication packets to and from the ground station 110. Similarly, each of the routing elements 124, 125 may be operably coupled to one or more satellite subsystems 126, 127. While two satellite subsystems 126, 127 are depicted in the system 100 of FIG. 1, the satellite subsystems 126, 127 may be integrated or shared, depending on the implementation.

Figure 2:
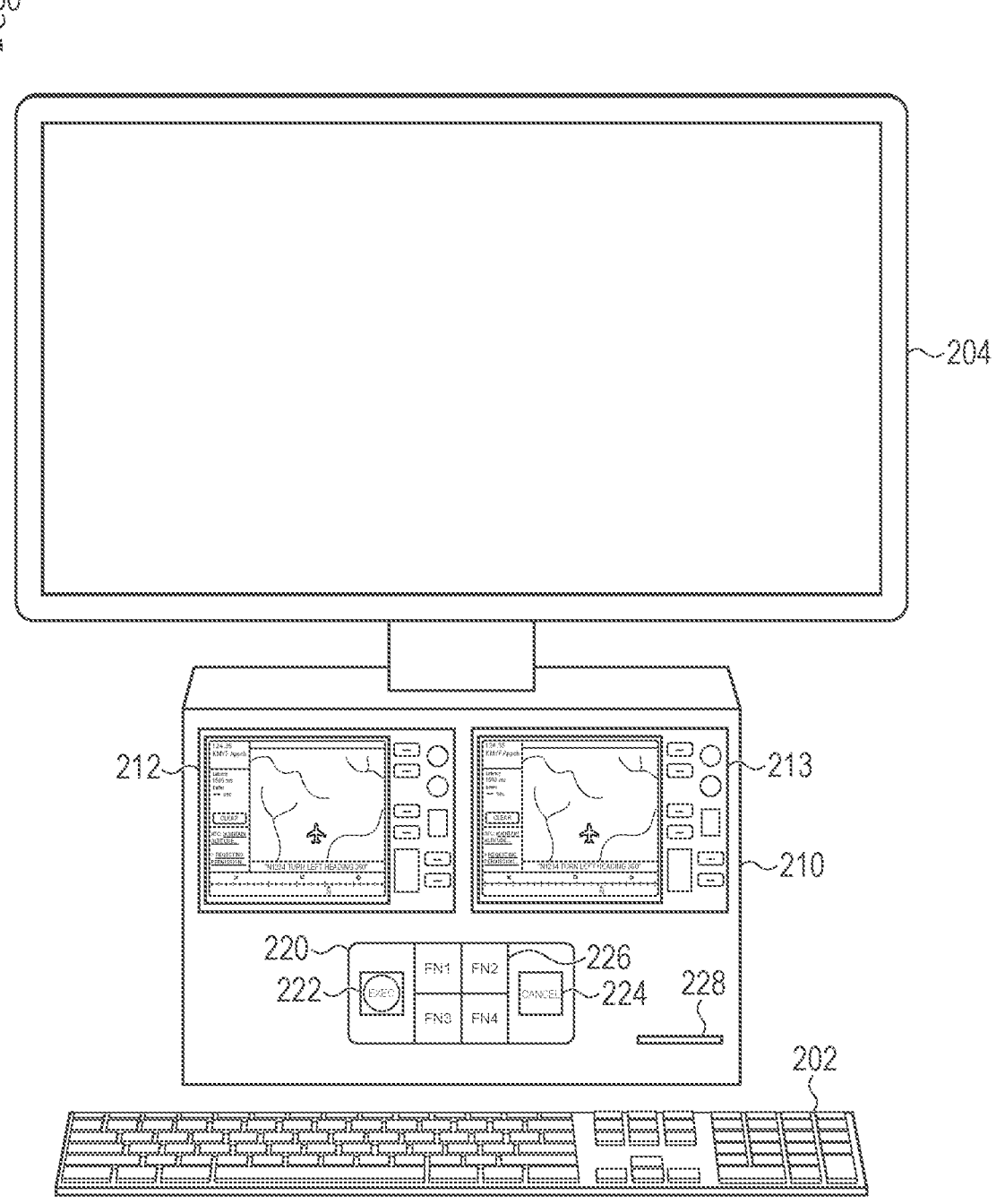
FIG. 2 depicts an example ground station for communicating with an aircraft.

FIG. 2 depicts an example ground station for generating and communicating flight plans and routes for an aircraft. Specifically, FIG. 2 depicts an example ground station 200 that may correspond to the ground station 110 of FIG. 1. An example operation of the ground station 110 of FIG. 1 is also described below with respect to FIG. 3. In general, the ground station 200 is configured to provide redundant flight management operations with an affirmative set of designated controls and a system for authenticating a remote pilot. The design of the ground station 200 provides important redundancy and confirmation that flight plans, routes, and other ground station instructions are accurate, authenticated, and intentionally executed. Moreover, in some cases, the ground station 200 receives requests for deviations from validated primary routes, validates those requests, and, if validated, provides modified routes to an aircraft for execution by the aircraft.

As shown in FIG. 2, the ground station 200 includes two ground-based flight management systems 212, 213 which may be operated in tandem. In particular, instructions or input provided to one of the ground-based flight management systems 212, 213 may be replicated to the other system allowing for parallel and redundant operations (and may also be replicated to the flight management system 103 onboard the aircraft 102). The flight management systems 212, 213 may be designed to receive full or partial flight plans directly via user input or via another flight plan input operation (e.g., uploading a flight plan). The flight management systems 212, 213 are operably coupled to a ground based RGMS (described below with respect to FIG. 3), which can be used to access flight plans, and generate and validate routes based on flight plans, and coordinate operations with other elements of the system. In some cases, the flight management system 212, 213 may operate as input devices for the RGMS. For example, flight plans may be input via a flight management system, and then the RGMS may access the flight plans and generate validated routes based on (and satisfying) the flight plans.

As shown in FIG. 2, the ground station 200 also includes an interface panel 220 that provides a set of designated control elements 222, 226, 224, which may be linked to specific system operations. In some cases, the designated control elements 222, 226, 224 can be customized by the user and in some cases, the designated control elements 222, 226, 224 have a dedicated function that cannot be changed or configured by the user. In the present example, the designated control elements 222, 226, 224 are hardware buttons that operate electromechanical switches. However, in other implementations, some or all of the buttons may be implemented via a programmable interface like a touchscreen display or configurable touch panel. In the present example, the control element 222 is operable to confirm execution of flight controls or a validated route. The control element 224 may be operable to cancel a flight control or a validated route. The other control elements 226 may be configured to handle a variety of designated functions including, for example, abort operations, dedicated flight commands (e.g., land now or land soon), or other predefined operations (e.g., vector or abort).

The ground station 200 of FIG. 2 also includes a port 228 for receiving electronic credentials from an operator of the ground station 200. In some implementations, the port 228 is configured to receive a smart card or other similar device that is adapted to authenticate the user. By way of example, the port 228 may be configured to electronically receive an authentication token or signature that is associated with a user authorized to operate the ground station 200. Specifically, the ground station 200 may be able to identify and authenticate a pilot that has been approved to create and execute flight instructions for an aircraft. The token or signature may be a Public Key Infrastructure (PKI) used to store a digital certificate, which may be used to identify the user. In some cases, the PKI may also be used to digitally sign communications or instructions and/or used for encrypting data packets transmitted using the system described herein.

The ground station 200 may also be used to monitor and control various aspects of the aircraft. As shown in FIG. 2, ground station 200 includes a monitor or display 204, which can be used to display proposed flight plans, routes, or aircraft commands for review and confirmation of the user. The display 204 may be operably coupled to an RGMS and used to perform various operations of the RGMS and other aspects of the system.

In some cases, the ground station 200 may display various navigational information including, without limitation, GPS location information, airspeed and heading information, radar information, or other data regarding a current status of the aircraft, as detected by one or more onboard sensors or devices. In some cases, the ground station 200 may display a video feed or image displaying video or images captured by an onboard camera. The ground station 200 may also display a virtual instrumentation panel that simulates a portion of the instrumentation panel on the aircraft, which may include distinct regions for each instrument including a graphical output that is varied in accordance with instrumentation or sensor readings obtained by the aircraft. The instrumentation panel may be displayed using the display 204 or may be displayed using an auxiliary display or device.

The ground station 200 may also provide one or more controls for operating an onboard radio or controlling other communications between the aircraft and another aircraft, air traffic control (ATC), or another entity. For example, using the virtual or hardware-based control elements, the remote pilot or other operator can select frequency bands and/or power levels used by the aircraft for communication with ATC, select one or more predetermined radio settings for operating the audio hub of the aircraft, reset the audio hub, or provide other remote commands, which are communicated through the communication system to the aircraft. The ground station 200 may also include audio elements like a microphone and speaker used to facilitate the creation and monitoring of audio communications with the aircraft or other entities.

As shown in FIG. 2, the ground station 200 may also include various input devices 202, which may include keyboards, mice, trackpads, tablets, joysticks, scroll wheels, and other input devices. Additionally, in some implementations, the ground station 200 may include multiple auxiliary displays or auxiliary devices, like tablets or notebook computers, which may be used to monitor or control other aspects of the system.

Figure 3:
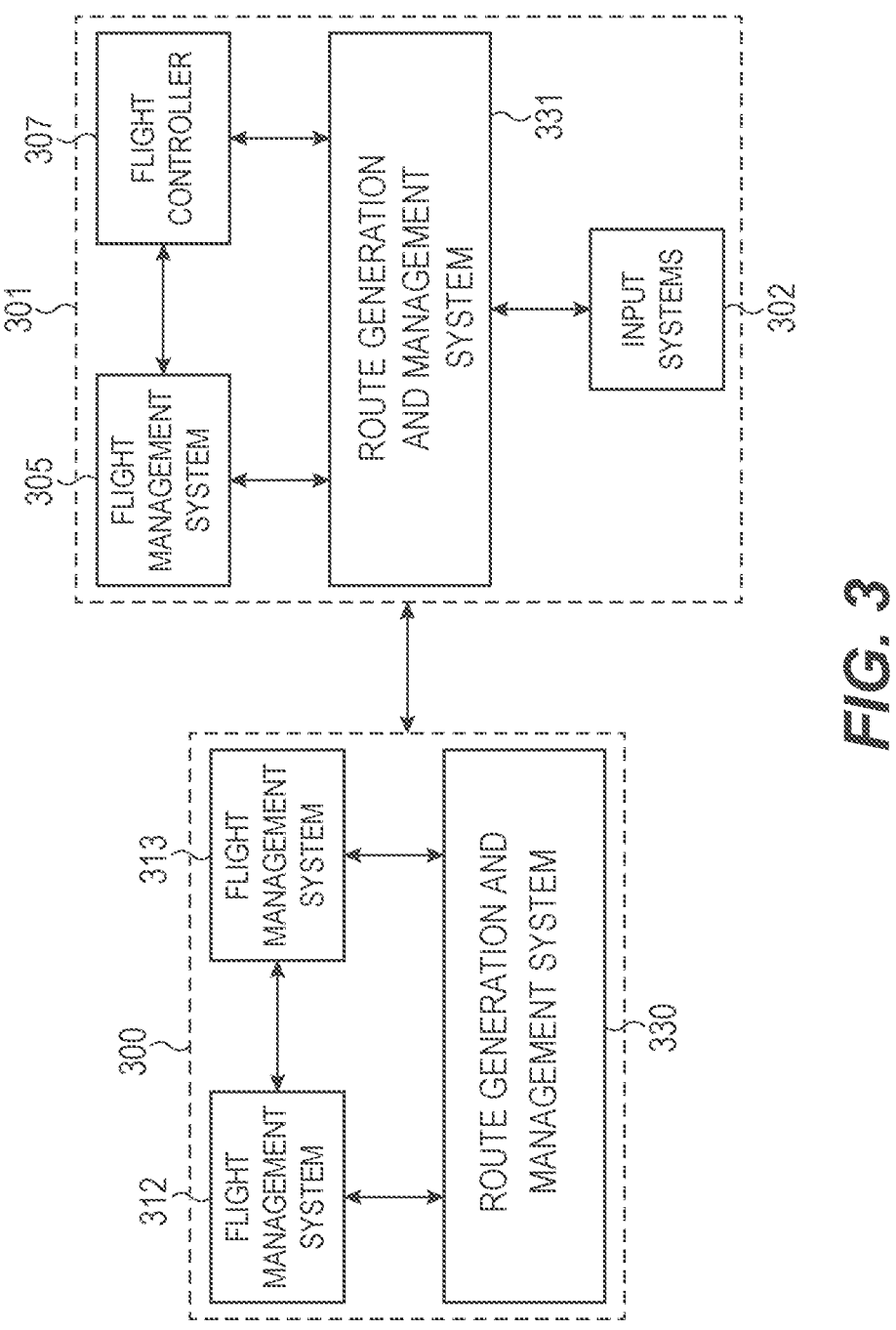
FIG. 3 depicts a schematic view of an example ground station in communication with an aircraft.

FIG. 3 depicts a schematic view of an example ground station 300 and an example aircraft 301. The ground station 300 of FIG. 3 corresponds to the ground stations 200 of FIGS. 2 and 110 of FIG. 1 and is configured to facilitate control and communications with the aircraft 301. The aircraft 301 corresponds to the aircraft 102.

In general, the ground station 300 is a system that generates validated routes (and/or validates routes) and provides validated routes that are executed only with an affirmative or explicit action taken by an authenticated user using a dedicated control (e.g., the control element 222 of FIG. 2). The schematic view and operation of the ground station 300 is provided by way of example and use of the system may vary depending on the implementation and the scenario. For example, not all instructions require an affirmative or explicit confirmation and some commands or instructions performed using the ground station 300 do not require an authenticated user. Other variations on the following example operations may also be implemented using the ground station 300.

As shown in FIG. 3, the ground station 300 includes dual flight management systems 312, 313 which may be operated in tandem. For example, operations initiated on the first flight management system 312 may be replicated on the second flight management system 313 allowing for redundant computation, storage, and execution of the various flight management operations.

The aircraft 301 may include an onboard RGMS 331, an onboard flight management system 305, a flight controller 307, and input systems 302. As described herein, the RGMS 331 may generally perform the same or similar operations as the RGMS 330, and may be configured to maintain redundancy with (and maintain the same operational state and information) as the ground-based RGMS 330. The RGMS 331 may be an embodiment of the RGMS 111 (FIG. 1). The flight management system 305 may perform the same or similar operations as the flight management systems 312, 313, and may be configured to maintain redundancy with (and maintain the same operational state and information) as the ground-based flight management systems. The flight management system 305 may be one of a pair (or more) of redundant flight management systems onboard the aircraft 301. The aircraft 301 may also include a flight controller 307, which may be an embodiment of the flight controller 109 (FIG. 1) and may be configured to operate the propulsion system and various flight control surfaces of the aircraft 301.

The aircraft 301 may also include input systems 302 that are manipulatable by operators to produce route modification requests. The input systems 302 may include an inceptor, such as a joystick or other manipulatable lever or system that a user can interact with to provide inputs that have a direction component and a magnitude component.

The RGMS 330 may receive inputs from the input systems 302 and may interface with the onboard flight management system 305 and/or the flight controller 307 to perform the operations described herein.

As used herein, the onboard and ground-based RGMS may be redundant systems (e.g., each providing the same or overlapping functionality), or they may otherwise cooperate to provide the functions of the RGMS as described herein. Accordingly, as used herein, an RGMS may refer to either an onboard RGMS, a ground-based RGMS, or both the ground-based and onboard RGMS. Moreover, the functions of the RGMS may be provided by a computing system or service or a combination of computing systems or services.

In some cases, the dual flight management systems 312, 313 may receive flight plans from an operator. For example, the flight management systems may provide user interfaces and other controls to allow a user to define a proposed flight plan. The RGMS 330 may access the proposed flight plan and generate a valid route that satisfies the flight plan. In some cases, proposed flight plans may be provided to the RGMS 330 via other input systems, bypassing the flight management systems. For example, in some cases, the RGMS 330 provides a graphical user interface that a user may interact with to provide a flight plan. The RGMS 330 may be operatively coupled to components and systems of a ground station (e.g., the ground station 200, including the flight management systems, displays, input devices, etc.) to facilitate user interaction with the RGMS.

A route generated from a flight plan (or otherwise configured to satisfy a flight plan or other flight objective(s)) may define a full three-dimensional trajectory for an aircraft to traverse in order to complete a flight. A route may include and/or specify all aircraft maneuvers and operations from an origin static location (e.g., hanger, apron, ramp, parking spot, etc.) to a destination static location (e.g., hanger, apron, ramp, parking spot, etc.), and may include departure taxiing, takeoff, flight, landing, and arrival taxiing. For example, a route may define the path along the ground that an aircraft will traverse in order to travel from an initial static (e.g., ground) location to a takeoff location, the path through the air (including any flight maneuvers and/or navigation sequences such as turns, altitude changes, etc.) from takeoff to landing, and the path along the ground in order to travel from a landing location to a destination static (e.g., ground) location. The route may also include or define other parameters, such as target speeds, target accelerations, and the like. A route may also include alternate routes or contingencies for varying flight conditions (e.g., weather changes, air traffic, fuel level) that may be monitored using sensors or other telemetry onboard the aircraft.

The RGMS 330 produce validated routes (e.g., routes that satisfy a flight plan) and may ultimately provide the validated routes to a flight controller of an aircraft in order to initiate or otherwise allow the aircraft to traverse the validated route. In order to qualify as a validated route, the route must be safe (according to one or more safety criteria), and the aircraft must be capable of traversing the route (e.g., the maneuvers and operations defined by the route are fully within the aircraft's operational envelope). For example, for a route to be validated, it must not intersect known obstacles, such as terrain, landforms, buildings, the ground, or the like. Determining whether the route intersects known obstacles may include accessing maps, charts, geographical data, or any other suitable information in order to determine the location of obstacles and determine whether they will interfere with the proposed route. Such information may be stored in a database or other data store and accessed by the RGMS 330 for analysis when generating a validated route. Accordingly, generating a validated route includes generating a route that satisfies a set of validity criteria (which may be specific to different aircraft, missions, geographic locations, etc.).

Generating a validated route may also include generating a route that the particular aircraft for which the route is intended is capable of performing the route. For example, the RGMS 330 may generate a route that is within the aircraft's operational envelope (including but not limited to a maximum altitude, maximum speed, stall speed, turn rate, climb rate, etc.).

In some cases, the RGMS 330 may validate proposed routes or route modifications. Proposed routes may be provided to the RGMS 330 or another system or service (e.g., from user input, a route generation service, or the like), and the RGMS 330 may separately validate the proposed route. Route modifications may be generated by a user manipulating an inceptor on an aircraft, as described herein. Validating a proposed route or route modification may include determining or confirming that the route satisfies the same validation criteria as any other validated route, including determining that the route is safe (according to one or more safety criteria), and that the aircraft is capable of executing the route (e.g., the route is fully within the aircraft's operational envelope). For example, validating a proposed route or route modification may include determining whether the route intersects known obstacles, such as terrain, landforms, buildings, the ground, or the like. Determining whether the route intersects known obstacles may include accessing maps, charts, geographical data, or any other suitable information in order to determine the location of obstacles and determine whether they will interfere with the proposed route. Such information may be stored in a database or other data store and accessed by the RGMS 330 for analysis when validating a route.

Validating a proposed route or route modification may include determining whether the particular aircraft for which the route is intended is capable of performing the route. For example, the RGMS 330 may confirm that the route is within the aircraft's operational envelope (including but not limited to a maximum altitude, maximum speed, stall speed, turn rate, climb rate, etc.). In some cases, as described herein, validating a route modification also includes determining whether the aircraft can safely return to a primary route after a deviation from the primary route.

Once a validated route is generated, or a proposed route or route modification is validated, (e.g., all validation criteria are satisfied), the route may ultimately be provided to a flight controller of an aircraft. In some cases, the validated route may be sent to the flight controller 307 and/or or the RGMS 331 of the aircraft. The flight controller 307 may then communicate with or otherwise control the operation of various aircraft systems in order to cause the aircraft to traverse the validated route. While the foregoing illustrates one example process for generating routes and/or validating proposed route and route modifications (and for ultimately providing the validated route to the systems that execute the aircraft operations to traverse the route), this is merely one example, and other processes are also contemplated.

As used herein, A validated route may represent a path or trajectory (e.g., the complete trajectory through three-dimensional space) between an origin location (e.g., an origin airport) and a destination location (e.g., a destination airport), and which satisfies one or more validation criteria. In some cases, an aircraft cannot initiate a route until and unless a validated primary route is in place (e.g., stored in an onboard RGMS, flight controller, or the like). The primary route may be deviated from, as described herein, but the aircraft may be configured to return to or otherwise complete the validated route in the absence of other overriding inputs (e.g., a request or command to cancel the primary validate route and take manual control of the aircraft).

As described herein, onboard (or in some cases ground-based) operators may wish to temporarily deviate from a primary route. Instead of a fully manual override of the autonomous flight systems, the techniques described herein allow for an operator to introduce a route deviation via a simple physical input that resembles a conventional flight control mechanism (e.g., an inceptor), but that actually causes a route deviation to be proposed to the RGMS for validation and autonomous execution. For example, as described herein, an operator may wish to initiate a turn that represents a deviation from the validated primary route. In such cases, the user may simply manipulate an inceptor (e.g., pivoting the inceptor in the direction of the desired turn). The manipulation of the inceptor may result in a request to the RGMS (either to the onboard RGMS 331 or the ground-based RGMS 330, or both) to compute a modified route with a predetermined flight maneuver. More particularly, as described herein, the manipulation of the inceptor may be mapped to a predetermined flight maneuver, such as a constant radius turn or a climb with a constant climb rate, and the RGMS may compute and validate a modified route that includes the predetermined flight maneuver.

The RGMS interprets the input from the inceptor as a proposal for a modified route, where the modification includes a predetermined flight maneuver that represents a deviation from the primary route. In response to receiving the input, the RGMS may map the input to a predetermined flight maneuver, and compute a modified route based at least in part on the predetermined flight maneuver. The RGMS may map the input to a predetermined flight maneuver based at least in part on the direction and the magnitude of the input to the inceptor. For example, the RGMS associates the direction and magnitude of the input to a particular predetermined flight maneuver, such as a 360-degree constant radius turn, an ascent, or a descent. For example, a stick manipulation in a lateral direction may indicate a turn in that direction, and the distance of the manipulation may be correlated to the turn radius. A stick manipulation in the fore/aft direction may indicate a change in altitude, and the distance of that manipulation may be correlated to a climb rate.

The RGMS may then validate the modified route that was generated in response to the inceptor input. Validating the modified route may include the same or substantially the same operations as validating the primary route, including, without limitation, determining whether the modified route intersects known obstacles, determining whether the proposed maneuvers are within the aircraft's operational envelope, and the like. In some cases, validating the modified route includes determining whether a valid path exists to return the aircraft to the primary route after the deviation is completed. In accordance with a determination that the proposed modified route satisfies the validation criteria (e.g., the route is valid), the modified route may be provided to the flight controller of the aircraft to cause the aircraft to traverse the modified route. In accordance with a determination that the proposed modified route fails validation criteria, (e.g., the route is not valid or not validated), the modified route may be disregarded or rejected. Thus, if the modified route is validated, the aircraft will execute the modified route, consistent with the operator's input to the inceptor. If the modified route is not validated, the aircraft will not execute the modified route (e.g., the modified route is disregarded), but will instead remain on the validated primary route. In this way, the operator can provide an intuitive flight-control style input, but the aircraft will not be under full manual control. Rather, the input results in a new validated route, which the aircraft executes autonomously. Moreover, at all times, the aircraft remains under autonomous control to traverse a validated route.

The input to the inceptor may result in different operations as compared to a manual input to a manual control stick or yoke. For example, the input to the inceptor does not correspond to a particular aileron or elevator setting or position (e.g., it does not directly control any flight control surfaces). Rather, the input to the inceptor may correspond to a particular predetermined flight maneuver, such as a constant radius turn or an ascent/descent. In the case of a constant radius turn, the aircraft may ultimately control numerous flight control surfaces and other systems to execute the constant radius turn (e.g., ailerons, rudder, throttle, etc.), which would not occur in response to a simple control stick or yoke input. In some cases, the only maneuvers or route deviations that can be produced by manipulating the inceptor are constant radius turns, climbs, and descents. For example, the inceptor inputs may map only to constant radius turns, climbs, and descents.

Figure 4:
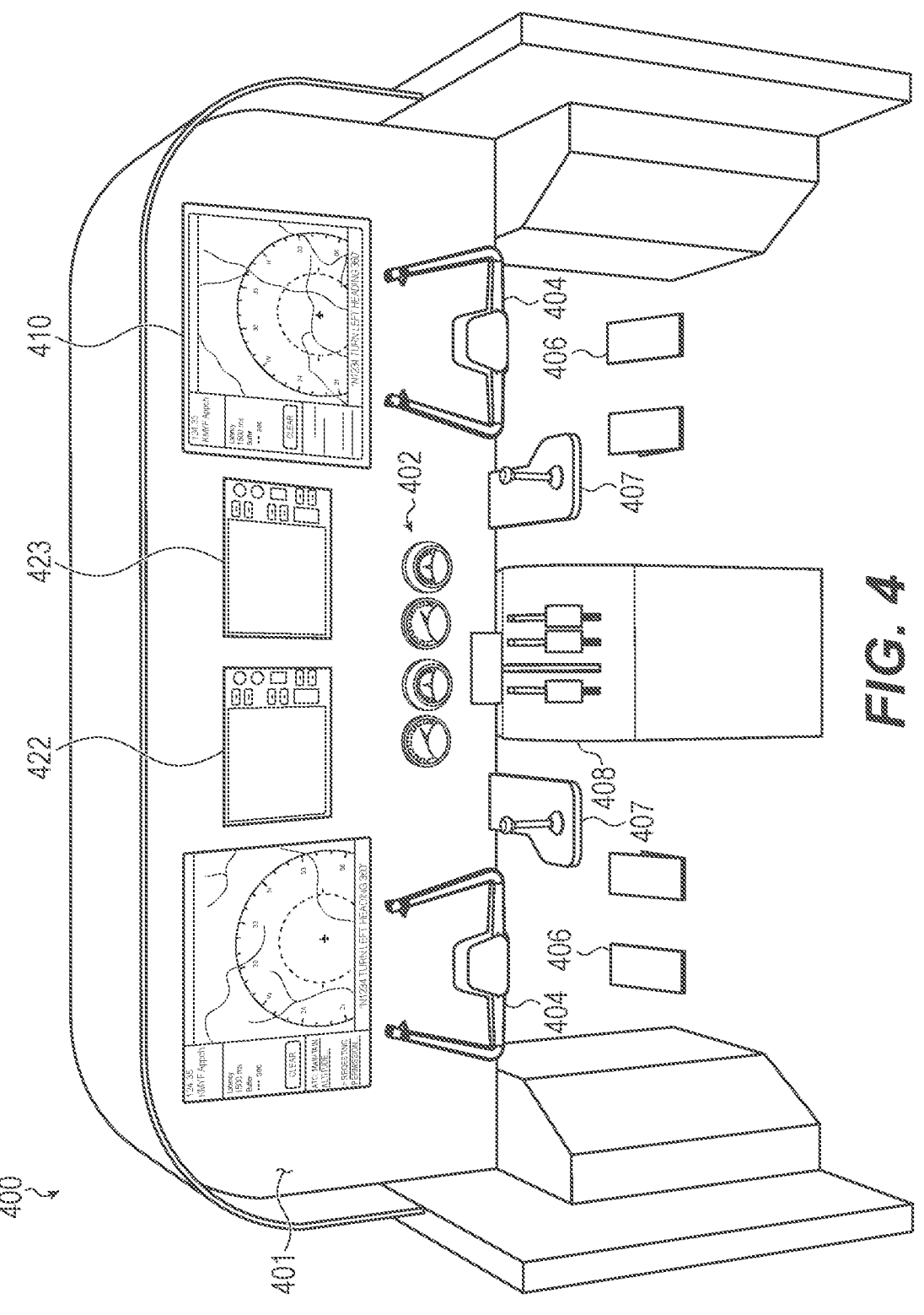
FIG. 4 depicts an example cockpit of an aircraft.

FIG. 4 depicts an example cockpit of an aircraft. As shown in FIG. 4, the aircraft 400 includes dual flight management systems 422, 423, which may be similar to the flight management systems 212, 213 and 312, 313 of FIGS.

2 and 3, respectively. The dual flight management systems 422, 423 may be similarly operated in tandem providing a level of redundancy and verification. The aircraft 400 also includes an instrument panel 401 that includes instruments 402 and other interface elements including a display interface 410. The instruments 402 may include computers, displays, dials, navigation equipment, communications equipment, and the like. When operated in a piloted or partially automated mode, the instruments 402 may also receive inputs from one or more onboard pilots or crewmembers to control various systems of the aircraft. The cockpit may also include various manual input systems for receiving physical inputs from a pilot or crewmember to control one or more aircraft systems. For example, the cockpit may include one or more yokes 404 (or control sticks or other structures). The yokes 404 may control flight control surfaces such as ailerons, elevators, ruddervators, stabilators, or the like. The cockpit may also include one or more sets of rudder pedals 406, which may control a rudder of the aircraft (or a ruddervator or other flight control surface).

The cockpit may also include one or more inceptors 407. An inceptor 407 may resemble a joystick or control stick and may be manipulatable by a user to provide directional inputs. The inceptor 407 may be separate from a yoke 404, as it may provide inputs to the RGMS of an aircraft system, rather than directly controlling flight control surfaces. The inceptor 407 may be manipulated in a manner similar to a control sick, with lateral (e.g., left/right) manipulations commanding turns, and fore/aft manipulations commanding changes in altitude. The inceptor 407 may include a haptic or tactile output system to provide tactile feedback to a user. The haptic output system may be configured to produce haptic outputs at predefined locations or manipulation distances, as described herein. In some cases, the haptic output system may include a haptic actuator, which may provide vibrational or other feedback via the inceptor 407. In some cases, the haptic output system includes a mechanical or electromechanical detent system that produces a resistance or other physical indication at certain manipulation distances. As described herein, the inceptor 407 may receive inputs that have a directional component and a distance or magnitude component, and information about the direction and magnitude may be provided to the RGMS (or other appropriate system) to request a particular deviation from a primary route (where the direction and magnitude of the input correspond to the desired direction and magnitude of the deviation). The inceptor 407 may be conveniently located so it can be manipulated by a user's hands while an operator is sitting in the cockpit.

In some cases, the inceptor 407 is not capable of manually or directly controlling the flight control surfaces or other systems of the aircraft. In other cases, the inceptor 407 may be operable in multiple modes, including a first mode in which the inceptor 407 is an input to the RGMS (manipulations act as inputs to the RGMS for route modifications), and a second mode in which the inceptor 407 acts as a flight control stick (e.g., the inceptor 407 controls the flight control surfaces of the aircraft).

The cockpit of the aircraft 400 may also include a flight control input assembly 408. The flight control input assembly 408 is conventionally where control levers for the propulsion system of an aircraft (e.g., a throttle control and power condition lever(s)) are positioned, and as such is also referred to as a throttle quadrant. The flight control input assembly 408 may include control levers and other input members (e.g., dials, buttons, knobs, etc.) that are manually manipulated by an onboard pilot or crewmember to operate the control systems of the aircraft. The flight control input assembly 408 may include control levers for controlling propulsion systems of the aircraft, flight control surfaces (e.g., flaps, elevator trim, air brakes), landing gear, or other aircraft systems.

The aircraft may also include a radio communication system for conducting radio-based communications with an ATC station, other aircraft, or other entities operating an appropriate radio. In some cases, the onboard radio communication system includes voice communications that are relayed from the operator of the ground station. The radio communication system may be broadly described as a VHF channel that is shared between an ATC facility or other ground-based station and any aircraft that are within a specified region or geographic boundary. In some cases, the radio communication system may be adapted for universal communications (UNICOM) and may be operating at one of a number of predefined frequencies. Typically, UNICOM channels used by large airports in the U.S. operate on a 122.950 MHz frequency band. Other airports may have ATC that operate on 122.700 MHZ, 122.725 MHz, 122.800 MHZ, 122.975 MHz, 123.0-00 MHz, 123.050 MHz, 123.075 MHz, or other frequency band. The UNICOM channel frequency bands and operational parameters may also vary by country, region, or other factor. The ATC facility or station may operate one or more Voice Communication Control Systems (VCCS) that are able to manage channel coupling, ground telecom links, telephone patching, and other functionality.

As described herein, inputs to (e.g., manipulations of) an inceptor may cause modified routes to be computed and validated (e.g., by an RGMS). FIGS. 5A-10 illustrate example representations of routes and route modifications, and how inputs to an inceptor cause route deviations to be proposed for validation and ultimately executed.

Figure 5A:
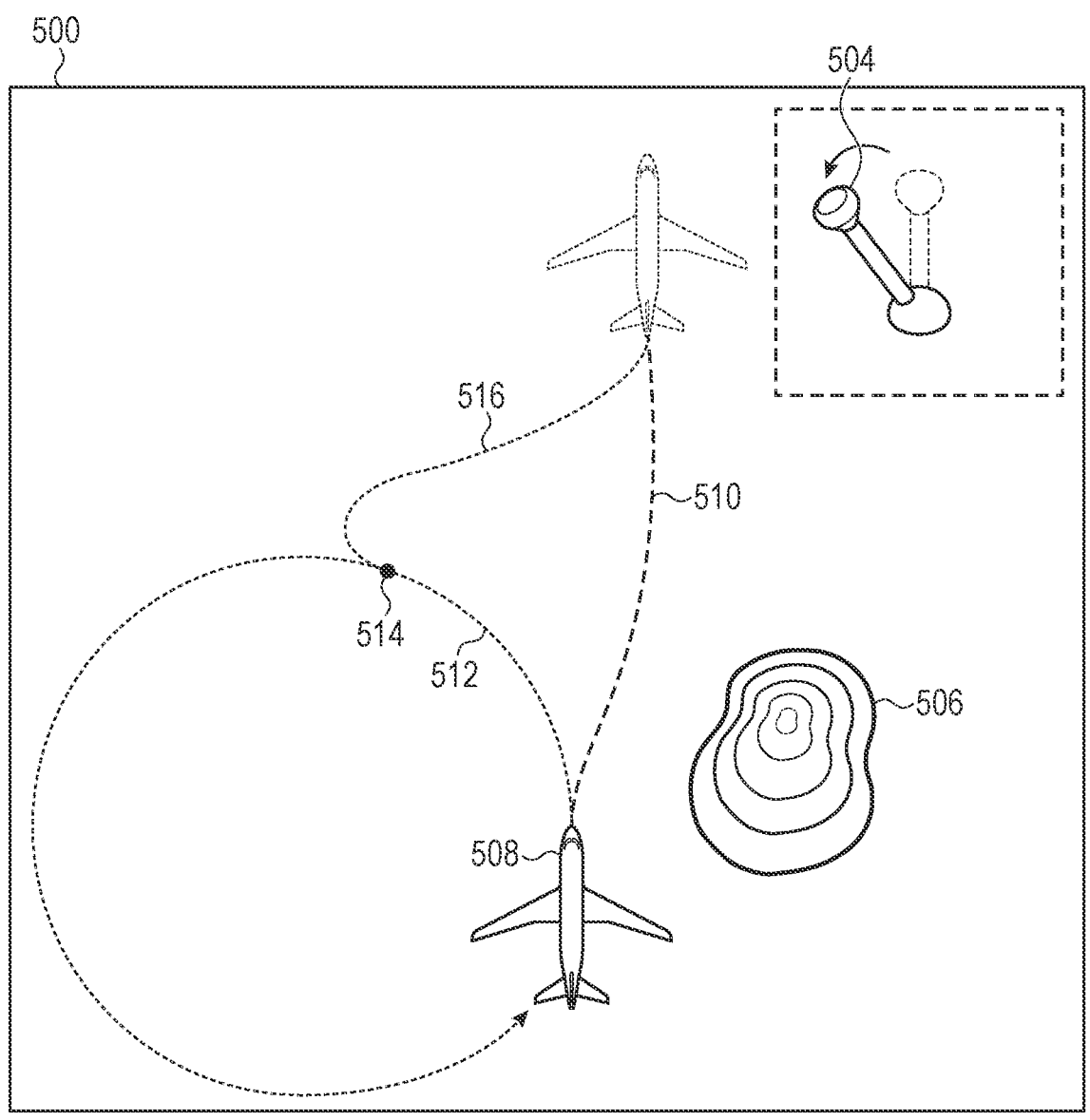
FIGS. 5A-5D depict example aircraft scenarios with validated routes and modified routes for an aircraft.

FIG. 5A is an example scenario 500, depicting an aircraft 508 that is traversing a validated primary route 510. While the aircraft 508 is traversing the validated primary route 510 (or simply route 510), a manipulation of an inceptor 504 is detected. As described herein, the manipulation of the inceptor 504 may correspond to or initiate a request for a deviation from the primary validated route 510. The request, which may be provided to the RGMS or other suitable system, may include information indicative of a direction of a requested change in trajectory and a magnitude of the requested change in trajectory. For example, as shown in FIG. 5A, the movement of the inceptor 504 (e.g., a lateral movement of a certain distance) may correspond to a request for a turn. As described herein, all lateral inputs to the inceptor may correspond to (e.g., be mapped to) a request for a constant radius turn. Thus, as shown in FIG. 5A, the lateral input may correspond to a proposal to modify the validated primary route 510 to include a constant radius turn, represented by the proposed modified route 512. Upon receiving the information indicative of the direction and magnitude of the requested change in trajectory (e.g., the direction and magnitude of the inceptor input), the RGMS (or another suitable system) may map the input to a predetermined flight maneuver (e.g., a turn) and compute a modified route (e.g., modified route 512) that corresponds to the turn, and the RGMS may validate the modified route.

Validating the modified route includes ensuring that the modified route (e.g., the constant radius turn) satisfies validation criteria, including but not limited to determining that the route is safe (according to one or more safety criteria) and that the aircraft is capable of executing the route (e.g., the route is fully within the aircraft's operational envelope). For example, validating a route may include determining whether the route intersects known obstacles, such as terrain, landforms, buildings, the ground, or the like. As shown in FIG. 5A, for example, the modified route 512 does not intersect a known landform 506, and as such, is validated by the RGMS.

In some cases, a lateral or turn input to the inceptor 504 may map to a request for a 360-degree turn (e.g., one of the predetermined flight maneuvers that inceptor inputs may be mapped to). In response to such an input, the RGMS may compute a modified route that initiates the 360-degree turn at a first location in the primary route, and resuming a portion of the primary route at a second location in the primary route. In the case of a 360-degree turn, the first and second locations may be substantially the same location in the primary route (e.g., the full turn returns the aircraft to the same location in the primary route where it left the primary route). In this way, the RGMS can confirm that the aircraft can safely execute the requested turn, while also ensuring that there is a validated return path to the validated primary route.

If the requested turn is validated, as described herein, the aircraft 508 will begin autonomously traversing the modified route, and, if no further changes to the inceptor input are detected (e.g., the operator maintains the same stick input), the aircraft 508 will traverse the entire modified route (e.g., the full constant radius turn), and end up back on the validated primary route, at which time the aircraft will once again autonomously traverse the primary route. If the turn is not validated, the aircraft 508 will simply remain on the validated primary route.

In some cases, after a route modification is validated and the aircraft begins to traverse the modified route that includes the turn, the operator may wish to return to the validated primary route without completing a full 360-degree turn. In such cases, the operator may return the inceptor to a neutral position (and/or select a "return to primary route" button or other selectable element on a display or instrument panel). The RGMS will treat these inputs as another request for a modified route, and will perform the validation options accordingly. Thus, for example, if the operator releases the inceptor at point 514 along the validated modified route, the RGMS may compute and validate a return path 516 to the validated primary route 510. In some cases, after the inceptor is returned to a neutral position, the aircraft will remain in the modified route 512 until a return path 516 is computed and validated.

In some cases, as described herein, after the inceptor is returned to a neutral position, the aircraft will request a further route modification for straight and level flight. If such route is validated, the aircraft will transition from the first modified route 512 to a second modified route (e.g., the straight and level flight). The aircraft may remain on the validated straight and level route until a timeout is reached, the operator requests a return to the primary route, another inceptor input is detected (e.g., before the timeout is reached), or another suitable event occurs.

Figure 5B:
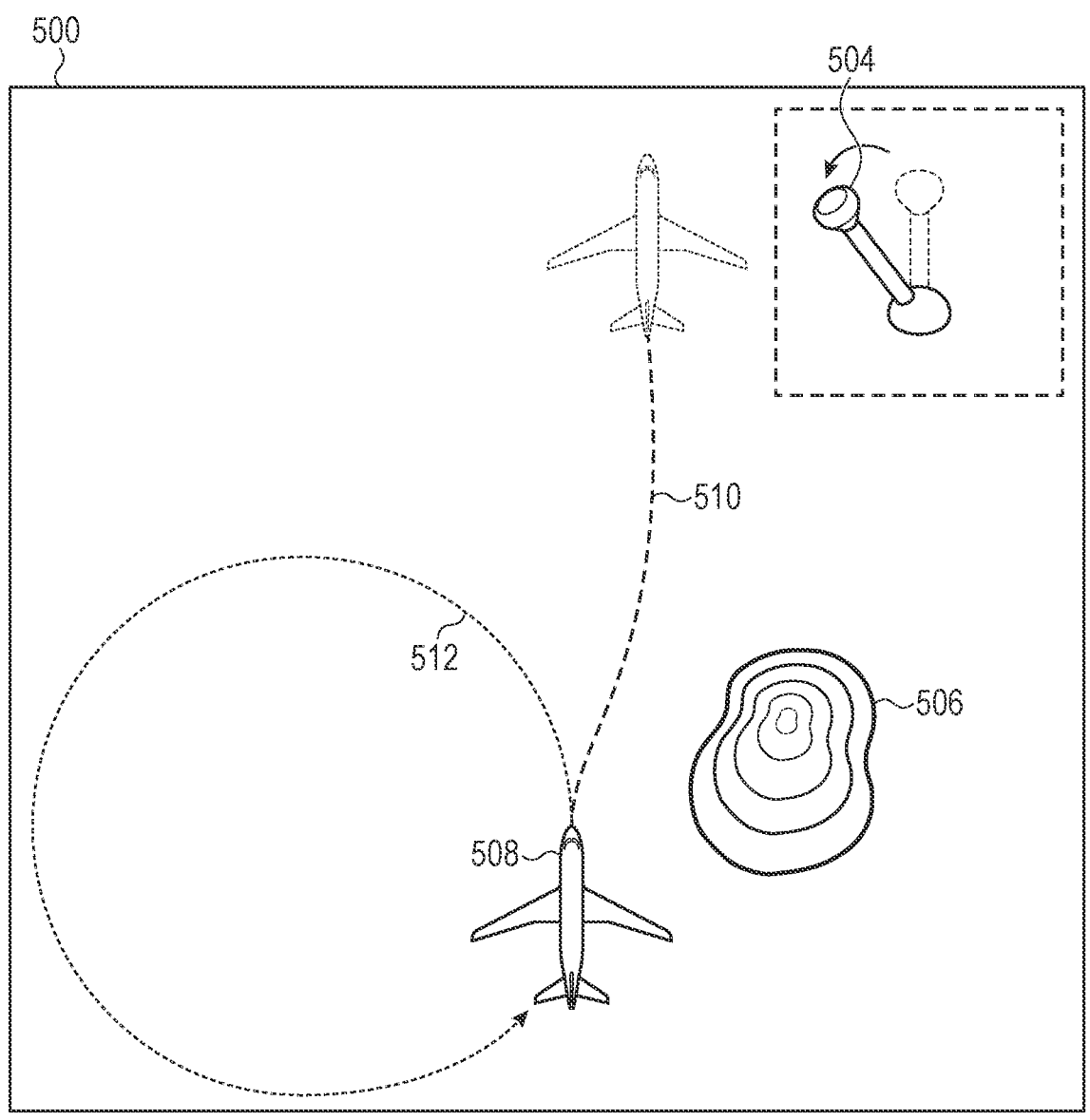
Figure 5C:
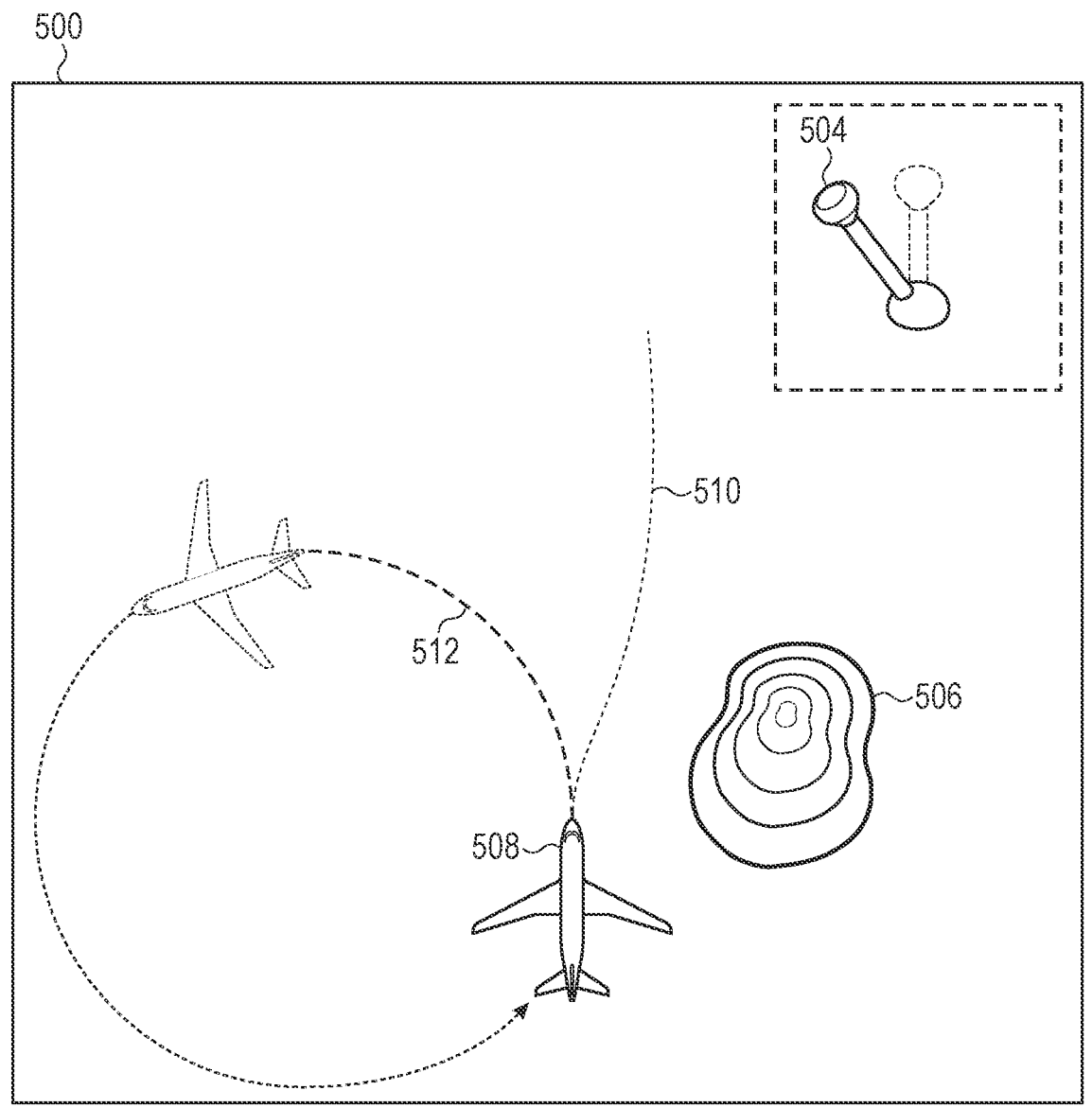
Figure 5D:
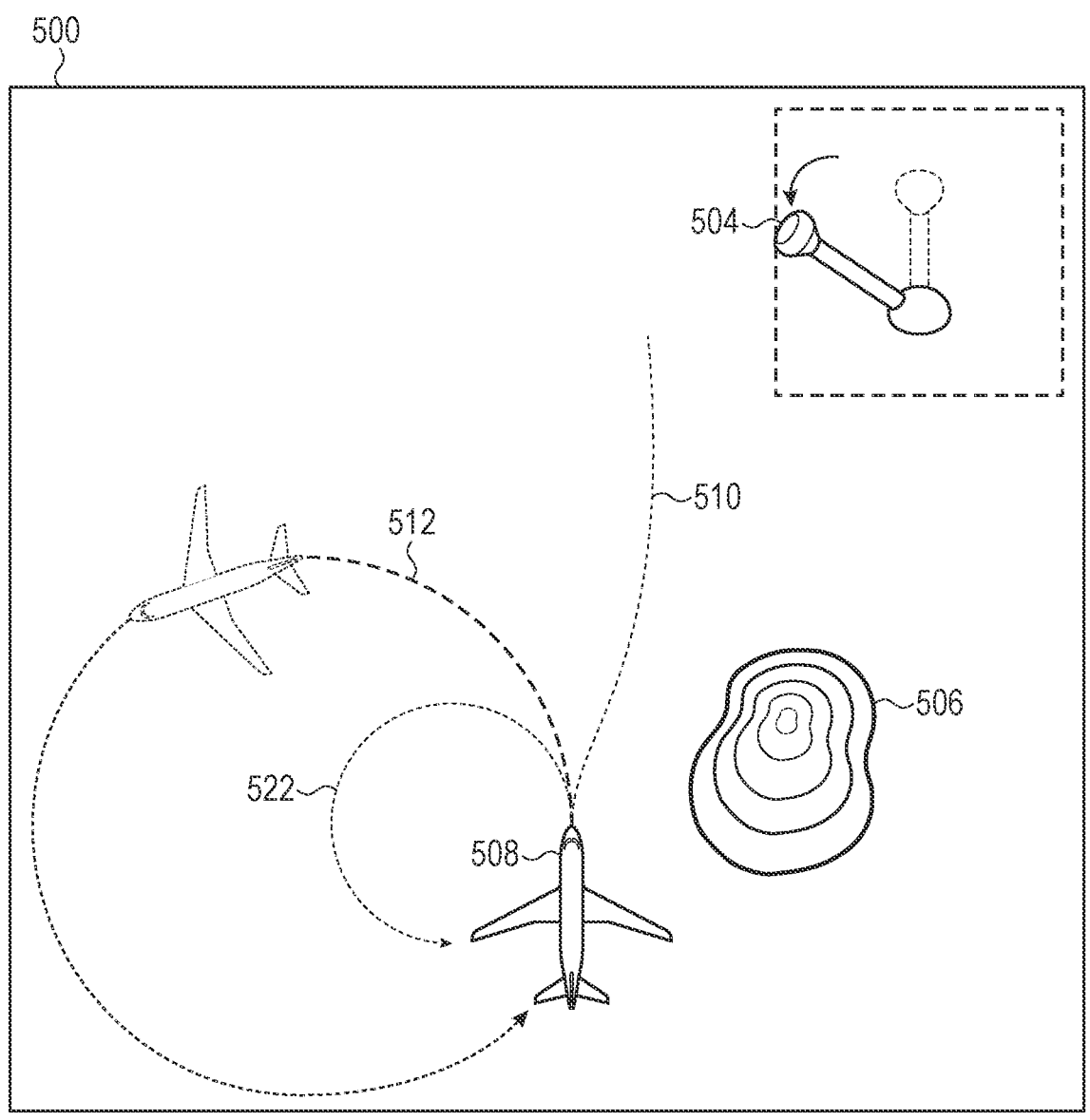

FIGS. 5B-5D illustrate example stages in an operation of responding to an inceptor input (e.g., manipulation) by generating and validating a modified route. In FIG. 5B, the aircraft 508 is traversing the validated primary route 510, and a manipulation of the inceptor 504 is detected. In response to the inceptor input, the RGMS or another suitable computing system may map the inceptor input to a predetermined flight maneuver (in this case a 360-degree turn having a constant radius). Mapping the input to a predetermined flight maneuver may include mapping the direction and magnitude of the input to a direction and magnitude of a flight maneuver. Thus, in the case of a lateral inceptor input, the input may be mapped to a constant radius turn that has a direction corresponding to the inceptor input direction (e.g., a lateral manipulation to the left) and a turn radius corresponding to the magnitude of the input (e.g., how far the stick is moved or pivoted). The RGMS may then compute a proposed modified route 512 that includes the predetermined flight maneuver. The modified route 512 may include a complete 360-degree circle, such that a return trajectory to the validated primary route exists and is validated. This ensures that the inceptor input will not cause the aircraft to fly into a scenario that it cannot return from, such as into a canyon or valley that has no reasonable return trajectories.

The RGMS then attempts to validate the modified route 512. In accordance with a determination that the validation of the modified route 512 fails (e.g., it fails to satisfy all applicable validation criteria), the aircraft 508 may disregard the modified route and remain on the validated primary route (e.g., the operator's input to the inceptor 504 is effectively ignored).

In accordance with a determination that the validation of the modified route 512 is successful, the modified route 512 may be provided to the flight controller (or other target system(s)) of the aircraft 508, thereby causing the aircraft 508 to traverse the modified route 512, as shown in FIG. 5C. As noted above, as long as the inceptor remains in the same position (e.g., a lateral move), the aircraft 508 will continue to traverse the modified route at least until it returns to the validated primary route.

While traversing the modified route, an operator may change the inceptor input, thus requesting a further modification to the validated route that is currently being executed (in this case, the modified route 512). For example, FIG. 5D illustrates the inceptor 504 being moved a second, greater distance in the first direction (as compared to FIGS. 5B-5C). As described herein, the magnitude of a stick manipulation may correlate to a particular route parameter. In this example, manipulation magnitudes correspond to the turning radius of a constant-radius turn (with greater manipulations producing smaller-radii turns). Thus, the deflection of the inceptor in FIG. 5D causes a second modified route 522 (e.g., a smaller radius turn) to be computed and validated using the same or similar validation operations described with respect to the first modified route 512. If the second modified route 522 is validated, the aircraft 508 will begin traversing the second modified route 522; if it is not validated, the second modified route 522 may be disregarded and the aircraft 508 will continue to traverse the first modified route 512.

Figure 6A:
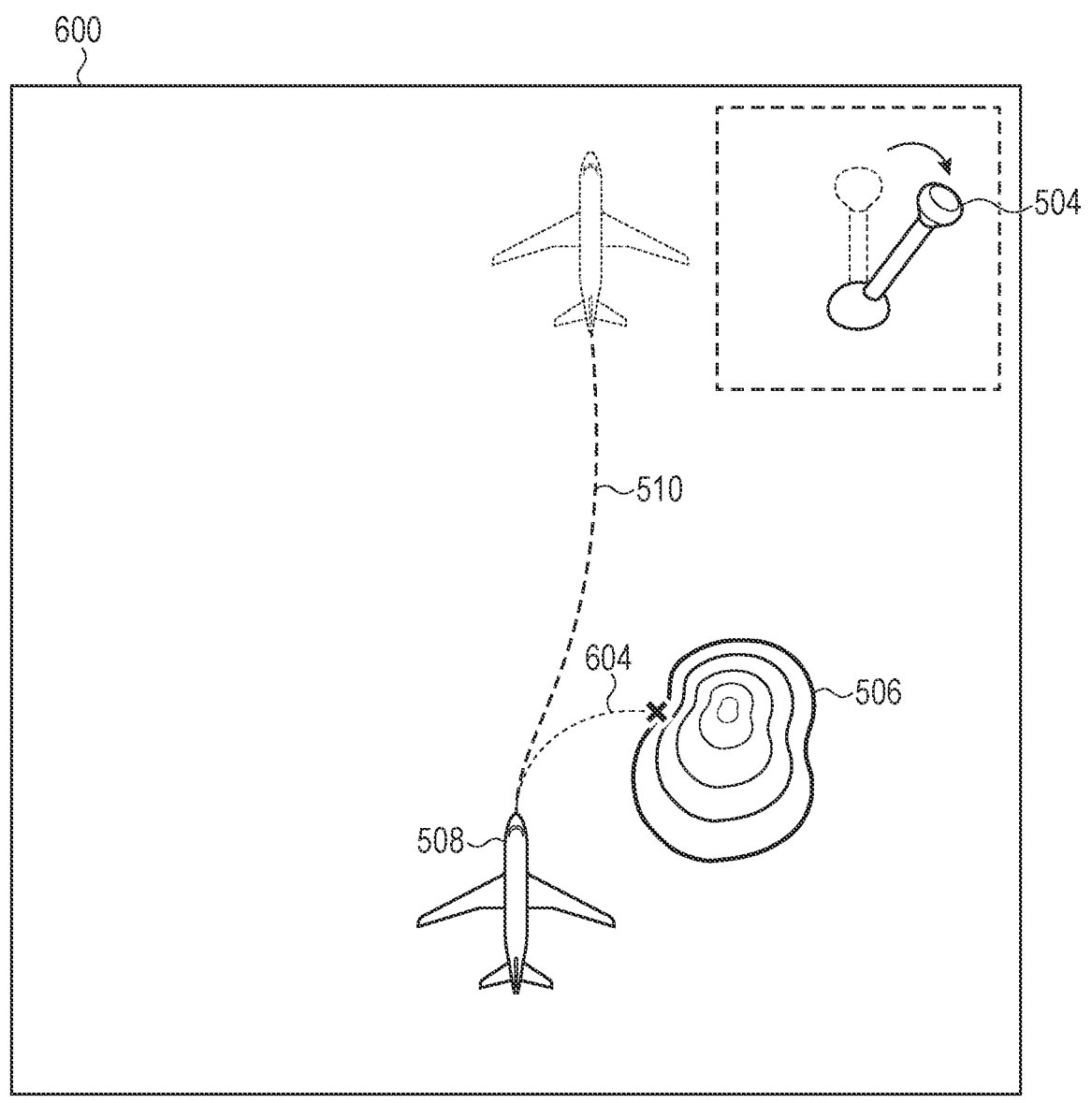
FIGS. 6A-6B depict additional example aircraft scenarios with validated routes and modified routes for an aircraft.

FIG. 6A is an example scenario 600 in which a proposed modified route is not validated. In particular, a manipulation of the inceptor 504 is detected while the aircraft 508 is traversing the validated primary route 510. In this case, the manipulation of the inceptor corresponds to a proposed modified route 604 with a predetermined flight maneuver that would intersect with an obstacle 506 (illustrated as a mountain or landform). Thus, the modified route 604 is not validated, and the aircraft 508 remains on the validated primary route 510. Upon receipt of an inceptor input that corresponds to a modification that cannot be validated, the aircraft may inform the operator of the validation failure. For example, any combination of audible, visible, or tactile feedback may be used to indicate the validation status of a proposed route modification. As one example, a tactile or haptic output may be provided via the inceptor to indicate that the proposed turn cannot be validated, thus informing the user that the turn will not be initiated.

Figure 6B:
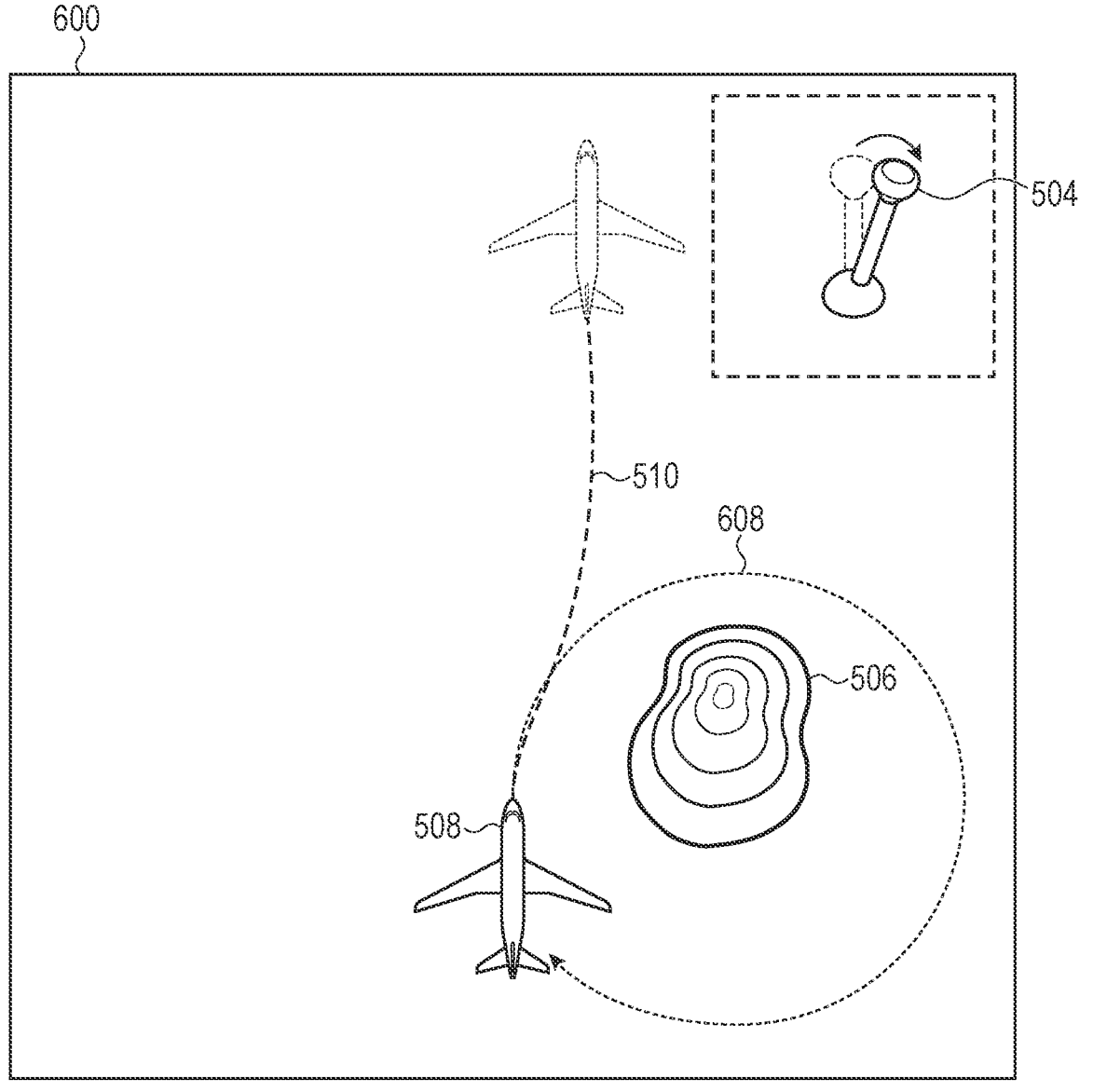

If the proposed modified route is not validated, as shown in FIG. 6A, the operator can easily and quickly adjust the requested flight maneuver by changing the manipulation of the control stick. For example, as shown in FIG. 6B, after the first proposed route modification failed to be validated, the operator may adjust the manipulation of the inceptor 504, in this example to reduce the magnitude or distance of the manipulation, and thus propose a route with a larger radius turn. As described, because the manipulation of the inceptor causes a modified route to be generated and submitted for validation, the reduced inceptor input results in the modified route 608 being generated and submitted for validation. In this case, the modified route 608 is validated, as it no longer intersects the landform 506 (and meets all other validation criteria), and the aircraft 508 will begin traversing the modified route 608.

As described, the position of the inceptor corresponds to a request to initiate a predetermined flight maneuver, and results in the computation and validation of a modified route. The particular route that is computed based on an inceptor manipulation may be based on the aircraft's current position, which changes with time as the aircraft traverses its current validated route. Thus, an operator may provide an input to the inceptor that corresponds to an invalid route (e.g., FIG. 6A), and then simply maintain the inceptor at the manipulated position. Once the aircraft flies into a position in which the inceptor input would produce a valid modified route (as computed by the aircraft), the aircraft may begin to autonomously traverse the now-valid modified route.

Figure 7:
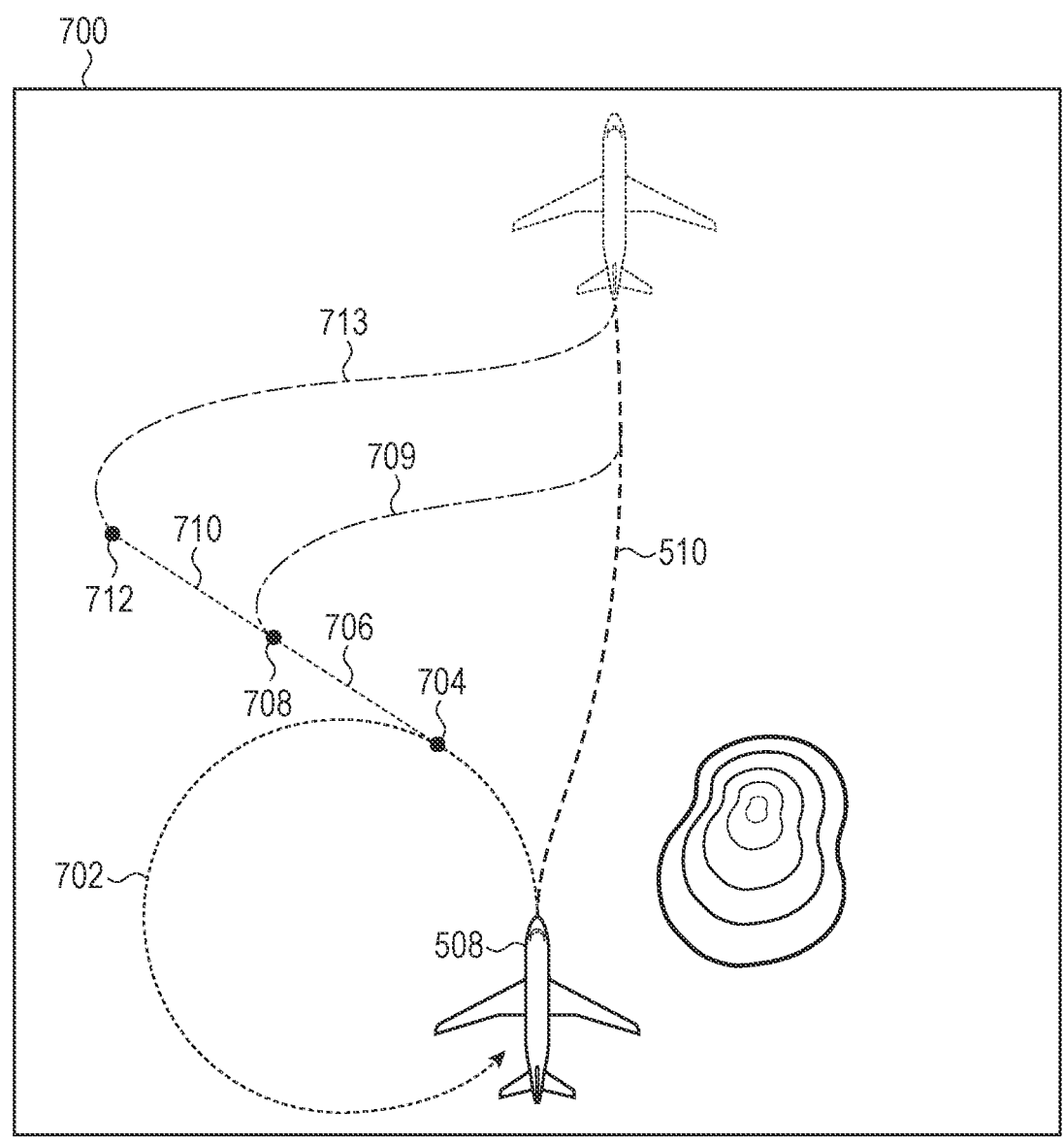
FIGS. 7-10 depict additional example aircraft scenarios with validated routes and modified routes for an aircraft.

As described herein, a proposal to modify a route with a turn may cause a 360-degree turn to be computed and validated, such that the completion of the maneuver will return the aircraft to or near the validated primary validate route. In some cases, however, an operator may wish to execute less than a full 360-degree turn. To maintain the integrity of the route validation system, premature exits from a validated turn and the subsequent return path to the validated primary flight path may also result in route modifications being computed and validated. FIG. 7 illustrates an example scenario 700 in which an operator initiates a modified route 702 (which is validated), and then exits the modified route 702. A modified route may be exited by returning the inceptor to a neutral position.

As shown in FIG. 7, upon detecting the return of the inceptor to the neutral position at location 704 along the modified route 702, a second modified route 706 may be generated and validated. Because the inceptor is in the neutral position, the modified route 706 corresponds to straight and level flight (which may be consistent with operator expectations). If the second modified route 706 is not validated, the aircraft 508 may remain on the modified route 702. If the second modified route 706 is validated, however, the aircraft 508 may exit the turn and follow the second modified route 706, following a straight and level path.

In some cases, when the inceptor is in the neutral position, straight and level flight will be maintained for a set distance or set duration before the aircraft will attempt to return to the validated primary route 510. For example, the modified route 706 resulting from the inceptor being returned to the neutral position may include a straight and level flight segment from location 704 to location 708, at which time (absent further inputs or inceptor manipulations) the aircraft may return to the primary route via path 709 (which may also be a validated route segment).

Options may also be provided to allow an operator to continue straight and level flight past the set duration and/or distance. For example, as the aircraft 508 is approaching location 708, an indication may be provided to the operator indicating that the aircraft is preparing to return to the primary route 510. The indication may include one or more of audio cues, visual cues, tactile cues, or the like. For example, a display may output a graphical element or effect, such a flashing color or background, a textual indicator, a light, or the like. As another example, the inceptor may vibrate or move or otherwise produce a tactile output. As yet another example, an audible alert such as a beep or alarm may be output. Any of these (or combinations thereof) may alert the operator to the upcoming return to the primary route, thus allowing the operator to take other actions as desired.

If the operator provides further inputs prior to the aircraft reaching location 708 and initiating its return along path 709, a further proposed modified route (corresponding to or include a predetermined flight maneuver) may be computed and validated. As shown in FIG. 7, the further proposed modified route that is received before location 708 corresponds to another straight and level segment 710. Because the inceptor is already in the neutral position at location 708, the operator may initiate a request for further straight and level flight by providing a different input, such as selecting an input object on a display or flight management system (e.g., a virtual button), actuating a physical button or other input member, providing a temporary or transient inceptor input (e.g., shaking the inceptor), or the like. If the operator wanted to deviate from the plan 706 with another turn, the operator may simply manipulate the inceptor and the system would operate as described herein to validate the turn and ensure a valid return path to the primary route.

Upon detecting the request to maintain straight and level flight past location 708, a proposed route corresponding to segment 710 may be generated and validated, and if valid, the aircraft 508 may continue along the segment 710. Once the set time or distance is reached (e.g., at location 712) without further input from the operator, the aircraft 508 will return to the validated primary route 510.

When validating a request for a straight and level route that is a deviation from the primary route, such as shown in FIG. 7, the RGMS may validate the straight and level segment (which may extend for a predetermined time or distance, as described above) as well as a return path to the primary route. More particularly, as noted above, the RGMS may not allow the aircraft 508 to begin a route modification if there is no validated path back to the primary route. In the case of straight and level flight (as compared to a full circle turn), the return path may be a different segment, and may be generated according to a set of route generation rules. For example, the return path may be generated by determining a shortest path that satisfies a set of criteria (e.g., minimum turn radius limits, g force limits, etc.) and that also satisfies all applicable validation criteria. Thus, if an inceptor is returned to a neutral position, the aircraft will only transition to straight and level flight if and when a validated route including the straight and level segment and the return segment is available. Otherwise, the aircraft will maintain its current route (e.g., either a constant radius turn of a validated modified route, the primary route, or a validated straight and level segment with a return path).

Figure 8:
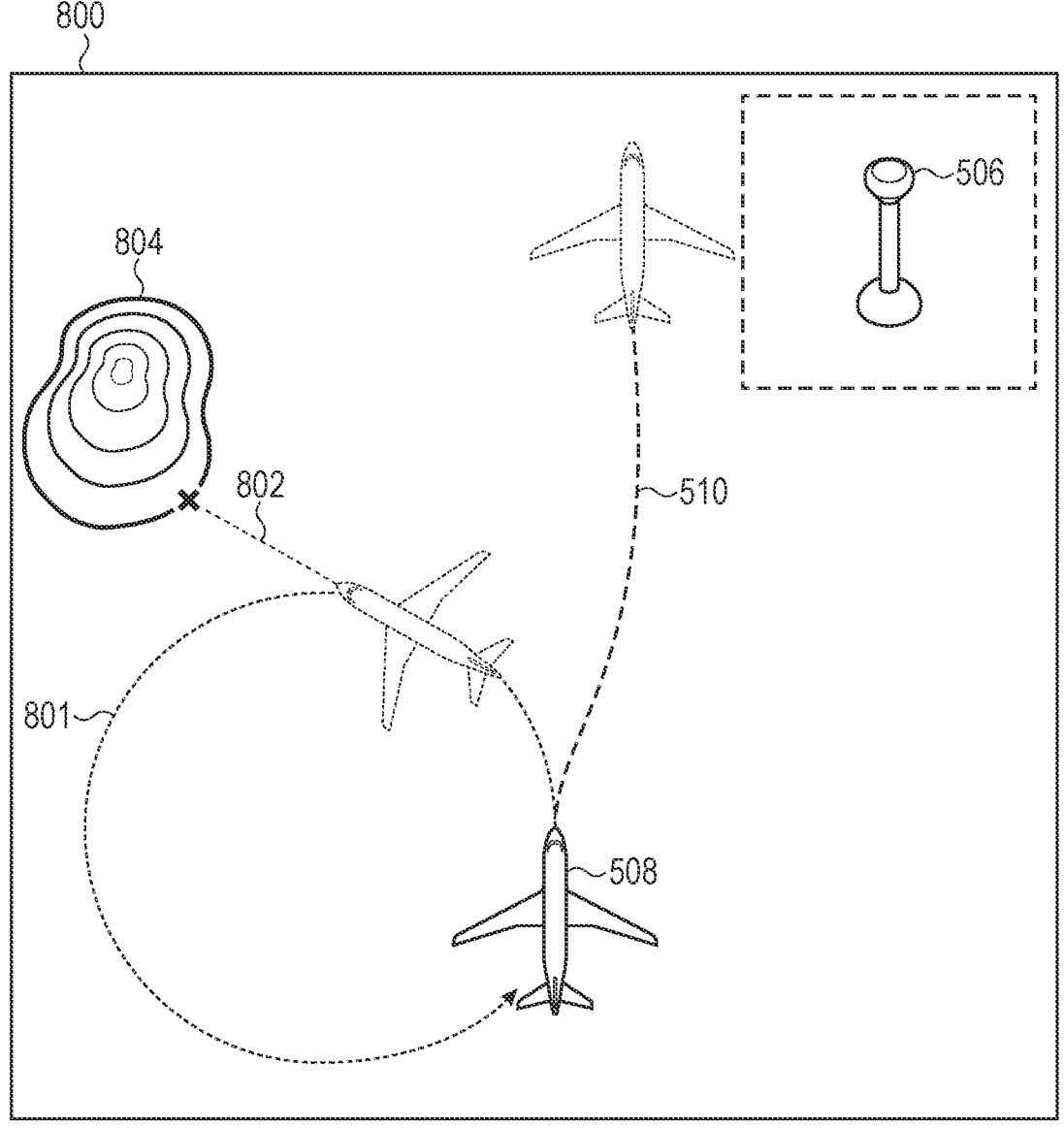

FIG. 8 illustrates an example scenario 800 in which a straight and level flight request (e.g., corresponding to the inceptor being returned to a neutral position) is received during traversal of a modified route 801 that corresponds to a constant radius turn. In this case, at location 801, the request for straight and level flight is detected and a proposed route modification 802 is generated and submitted for validation. As shown, the modified route 802 cannot be validated, as it intersects with a landform 804. Accordingly, the proposed route modification 802 is disregarded and the aircraft 508 remains in its modified route 801 (e.g., it remains in the turn, despite the inceptor being in a neutral position). If the inceptor is kept in the neutral position as the aircraft 508 traverses the modified route 801, the aircraft may continue to propose straight and level routes, and when a valid plan is available (e.g., based on the then-current location of the aircraft 508 along the route 801), the aircraft may transition out of the turn.

Figure 9:
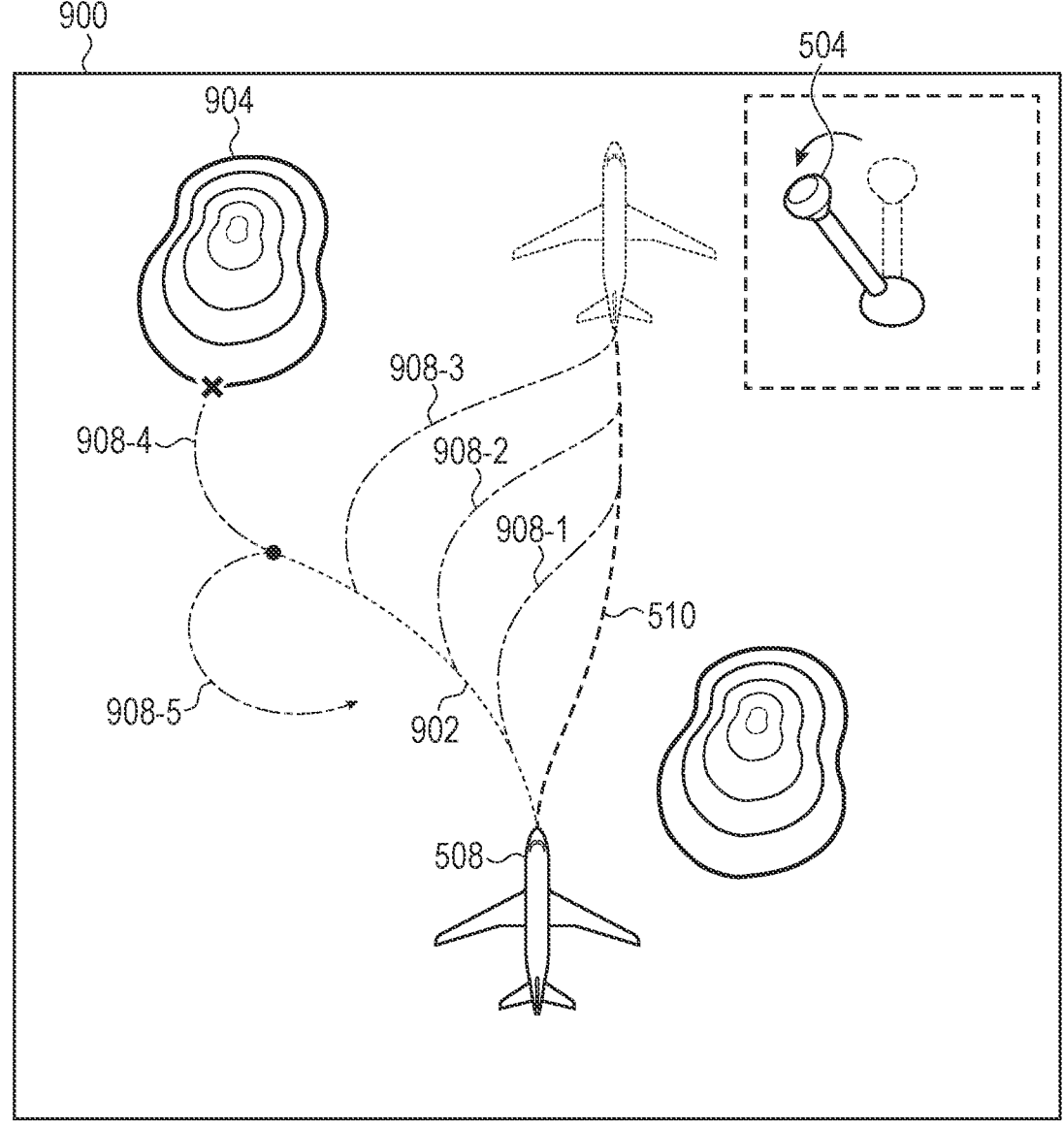

FIG. 9 illustrates an example scenario 900 with various return paths from a proposed modified route. Return paths may be generated by the RGMS or other system according to route generation rules, as described herein.

Returning to FIG. 9, a modified route 902 may be computed and validated in response to a particular manipulation of the inceptor 504. If the route 902 is validated and traversed by the aircraft 508, the operator may at any time command a return to the primary route. Such command may be provided by centering the inceptor (in implementations or modes where centering the inceptor commands an immediate return, rather than a straight and level flight segment), or via another input (e.g., actuating a physical button or selecting a virtual button on a display). As shown in FIG. 9, various return paths 908 may be generated and submitted for validation if a return command is received at various locations along the route 902. In this example, return paths 908-1 through 908-3 can be validated and would therefore be traversed if the return command is received at corresponding points along the route 902. Return paths 908-4 and 908-5 may represent alternative return paths for a return command received at location 906. In particular, return path 908-4 cannot be validated. In such cases, the RGMS or other suitable system may generate alternative return paths (using route generation rules) and if a validated return path can be found, such as return path 908-5, the aircraft 508 will traverse that path.

In some cases, information relating to the primary and modified route, the inceptor inputs, and the results of the validations may be displayed to an operator of the aircraft 508. For example, a map illustrating the aircraft, its environment, and its routes (e.g., the validated primary route and any currently proposed or pending modified routes) may be displayed to an operator via a display interface (e.g., the display interface 410), flight management system (e.g., flight management systems 422, 423), or any other suitable display or interface device. In some cases, proposed and validated modified routes may be updated in real-time based on the position of the inceptor. Thus, as an operator manipulates the inceptor, the resulting modified route may be displayed and updated, allowing the operator to visualize, in real time, the route that is proposed and/or is being executed.

In some cases, the various routes that may be displayed to a user (e.g., primary, modified, proposed, etc.) may be visually differentiated from one another, such that the operator can easily assess the aircraft's situation and its possible upcoming maneuvers. For example, the validated primary route may appear in a first color, while proposed modifications that fail validation may appear in a second color, and modifications that pass validation may appear in a third color (all colors of which may be different). In some cases, different line patterns or other visual, audible, or tactile indications may be provided to differentiate between the various routes and their validation (or other) status.

The foregoing examples use lateral inceptor manipulations and constant radius turns as example manipulations and corresponding flight maneuvers, though other inceptor manipulations and flight maneuvers may also use the same or similar operations. For example, fore/aft manipulations of the inceptor may map to flight maneuvers that change the altitude of a route, where the direction of the inceptor manipulation corresponds to a direction of the altitude change, and the magnitude of the inceptor manipulation corresponds to a climb rate of the change in altitude. For example, a forward inceptor manipulation may map to a descent flight maneuver, and an aft or reverse inceptor manipulation may map to an ascent flight maneuver. The magnitude or distance of the fore/aft movement may define the climb rate, with larger forward manipulations correlating to faster descent (e.g., a more negative climb rate), and larger aft manipulations corresponding to a faster ascent (e.g., a more positive climb rate). Additionally, proposed altitude deviations may be validated in the same or similar manner as proposed turns, such that an inceptor manipulation causes a modified route (with the corresponding change in altitude) to be computed and submitted for validation. If validated, the aircraft will traverse the modified route, and if not validated, the modified route will be disregarded, and the aircraft will not traverse it. Moreover, for a modified route with a change in altitude to be validated, it must meet the same or similar validation criteria as a turn, including that the plan does not intersect with known obstacles, that the aircraft is capable of the maneuver (e.g., it does not violate the aircrafts ceiling or maximum climb rate), and the like.

Figure 10:
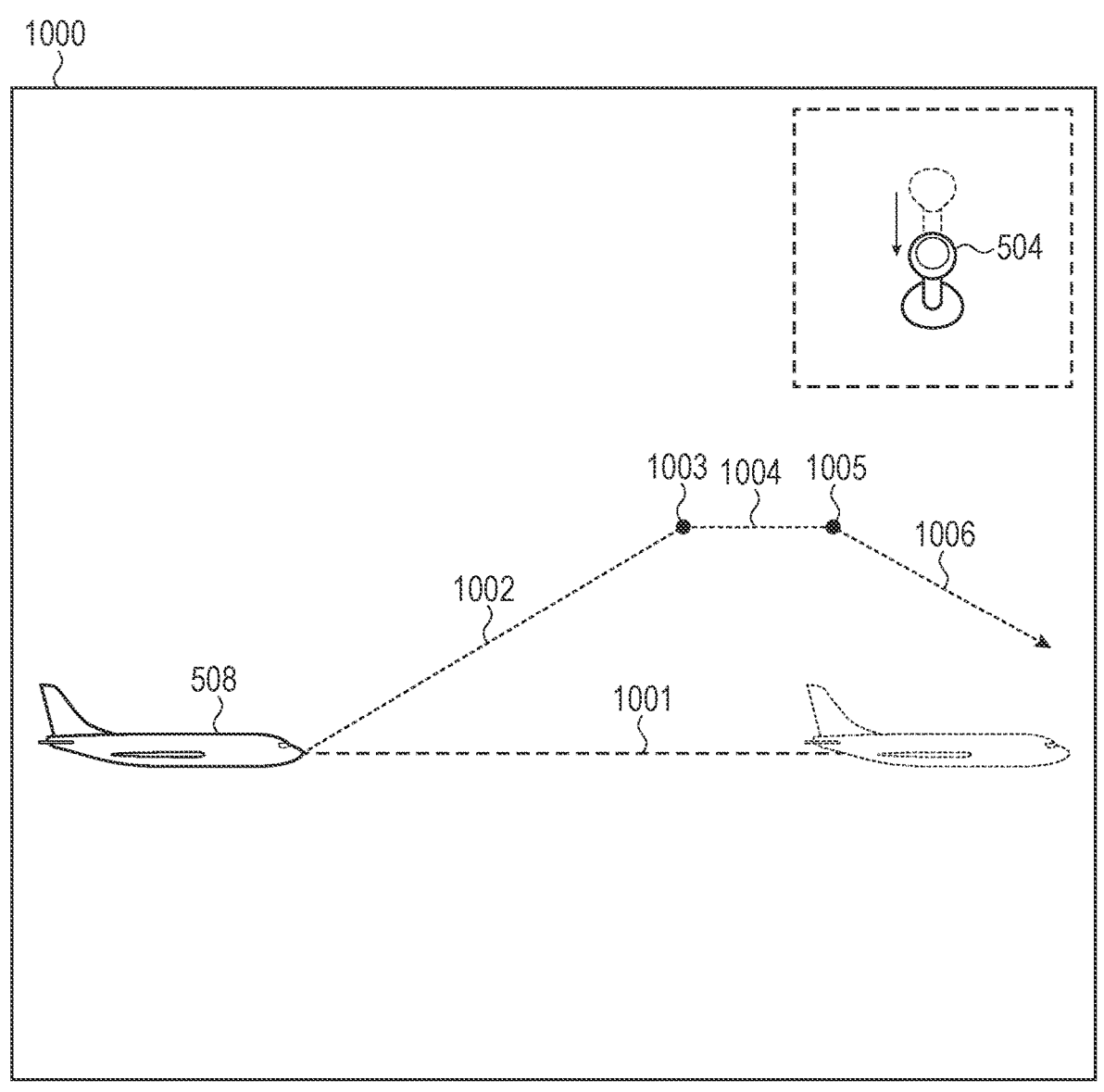

FIG. 10 illustrates an example scenario 1000 in which an aft manipulation of the inceptor 504 is detected while the aircraft 508 is traversing a validated primary route 1001 (which is shown as level flight, though this is merely an example). In response to the aft manipulation of the inceptor, the RGMS may map the input to a predetermined flight maneuver (e.g., an ascent maneuver at a constant climb rate), compute a proposed modified route 1002 that includes the predetermined flight maneuver (e.g., an ascent at a climb rate corresponding to the magnitude of the inceptor manipulation). If validated, the aircraft 508 may traverse the modified route 1002, and if not validated, the modified route is disregarded. Timeouts from the route deviation may also operate as with turns. For example, if the inceptor 504 is returned to the neutral position at location 1003, the RGMS may compute and validate a modified route 1004 corresponding to level flight. If no further inceptor manipulations are detected before a predetermined time duration or distance elapses (e.g., before the aircraft 508 reaches location 1005), the RGMS may generate and submit for validation a route 1006 to return the aircraft 508 to the primary route 1001.

As with turns, the routes for predetermined ascents or descents may initiate the maneuver at a first location in the primary route and resume a portion of the primary route at a second location in the primary route. In the case of ascents/descents, however, the first and second locations may be different, as the aircraft may continue to traverse the ground-path of the primary route during the ascent and any further flight at the new, modified altitude. Thus, when it returns to the primary route, it may do so at a location further along the primary route.

In some cases, compound inceptor inputs may be recognized, and may result in a proposed modified route that includes both turns and altitude changes. In such cases, the entire route (e.g., a constant radius turn combined with a constant ascent rate, along with a return to the validated primary route) may be generated and submitted for validation. Additionally, the system may accommodate changes to one type of flight maneuver (e.g., altitude) while another maneuver is maintained (e.g., a turn). In such cases, the RGMS will operate as described herein (e.g., generating and validating the proposed change in altitude while maintaining the turn).

Figure 11:
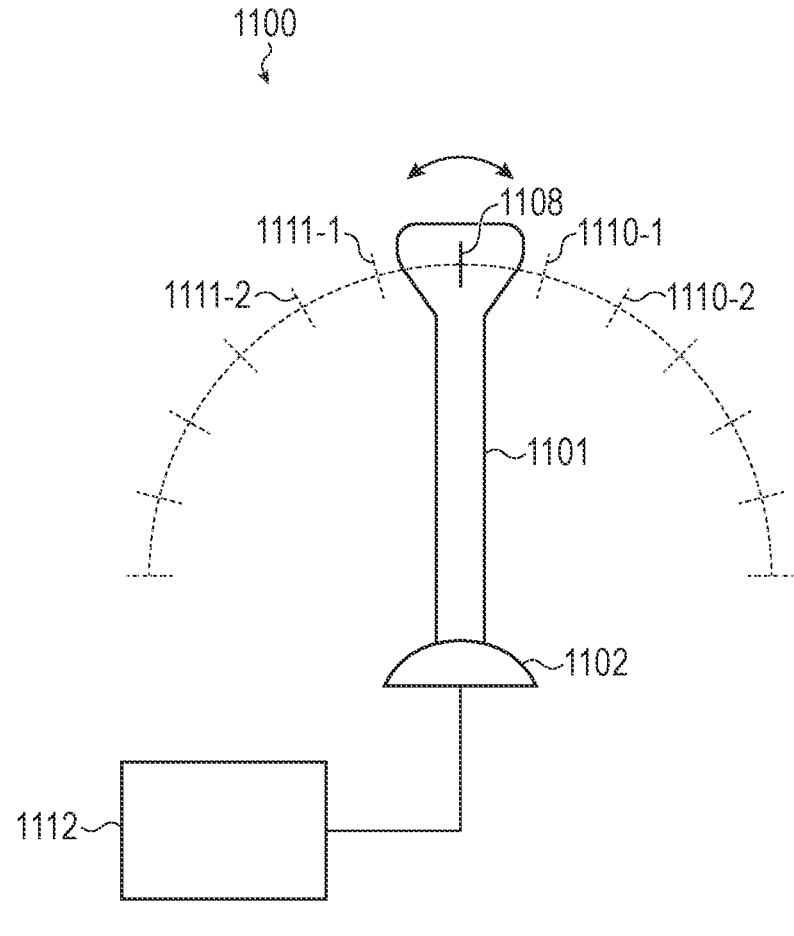
FIG. 11 depicts a schematic view of an inceptor for providing route modification inputs to an aircraft.

FIG. 11 illustrates an example inceptor 1100, which may correspond to the inceptors 107, 407, 504, or any other inceptor described herein. The inceptor 1100 may include a base 1102 and a stick member 1101 that is movable relative to the base 1102. The stick member 1101 may be movable along at least two directions, including a lateral direction and a fore/aft direction. The movement represented in FIG. 11 may correspond to either direction, and thus illustrates inceptor function for both turn maneuvers and ascent/descent maneuvers (though it will be understood that the inceptor may be capable of receiving both lateral and fore/aft manipulations, including compound directional inputs, such as a descending turn or an ascending turn).

The inceptor 1100 may be logically associated with a set of discrete deflection positions 1110, 1111 (representing the magnitude of an inceptor manipulation) along a movement or manipulation direction. The discrete deflection positions may correspond to or map to a certain predetermined flight maneuvers. In this way, an operator can easily maintain a certain maneuver request without causing minor fluctuations in the proposed maneuver. For example, for lateral inceptor movements, each discrete position may correspond or map to a particular turn radius (e.g., 1111-1 may correspond to a 1-mile radius turn to the left; 1111-2 may correspond to a 0.75-mile radius turn to the left; 1110-1 may correspond to a 1-mile radius turn to the right; 1110-2 may correspond to a 0.75 mile radius to the right; etc.). As another example, for fore/aft inceptor movements, each discrete position may correspond or map to a particular climb rate (e.g., 1111-1 may correspond to a 100 foot-per-minute descent; 1111-2 may correspond to a 200 foot-per-minute descent; 1110-1 may correspond to a 100 foot-per-minute ascent; 1110-2 may correspond to a 200 foot-per-minute ascent; etc.). In some cases, requests to execute predetermined flight maneuvers are initiated in response to the inceptor being moved to or past a discrete deflection position. Thus, for example, when the inceptor 1100 is moved from the neutral position 1108 to the position 1111-1, the RGMS may take no action until the inceptor 1100 reaches the position 1111-1 (at which point a corresponding modified route is generated and submitted for validation). If the operator continues to move the inceptor 1100 in the same direction, the RGMS may take no further action until and unless the inceptor 1100 reaches the position 1111-2 (at which point a corresponding modified route is generated and submitted for validation).

The inceptor 1100 may be mechanically configured to produce quantized or discrete signals at each discrete deflection position, and the RGMS (or other suitable system) may receive or detect those signals. In other examples, the inceptor 1100 may be configured to produce a continuous or analog-style signal that correlates to the position of the inceptor, and the RGMS (or other suitable system) is configured to interpret the signal to determine the position of the inceptor relative to the discrete deflection positions.

The particular mappings of flight maneuvers (e.g., turn radii, climb rates, etc.) may be customized in individual implementations, such as to accommodate user preferences, aircraft performance capabilities and/or limitations, etc. Moreover, the number of gradations and their relative angular position relative to the neutral position of the inceptor as shown in FIG. 11 are merely examples, and other quantities and angular positions are also contemplated.

As described herein, tactile feedback may be provided via the inceptor 1100 to indicate when the inceptor 1100 has reached or passed the deflection positions, thus providing operators with information about the position of the inceptor (and thus the route that is being requested). Tactile feedback may be provided by a mechanical system, such as a spring detent system, or a haptic actuator (which may be represented by item 1112). The haptic actuator 1112 may produce haptic outputs in response to detecting that the inceptor 1100 is positioned at certain deflection positions. The haptic outputs may be vibrations, pulses, temporary resistance to change in motion (e.g., a friction brake), or the like. In some cases, different deflection positions are associated with different haptic outputs. For example, an intensity, frequency, or other haptic parameter may change as the inceptor 1100 moves among the deflection positions (e.g., frequency or amplitude of a haptic output may increase as the deflection position increases further from the neutral position). In some cases, the item 1112 may represent or include a position sensing system, a motorized feedback and/or control system, or other system of or that interfaces with the inceptor 1100.

In some cases, the haptic system may provide a retention force to aid an operator in retaining the inceptor at the deflection positions. The retention force may be less than the returning force of the inceptor (e.g., the force that tends to return the inceptor to the neutral position), such that the operator is aided in retaining the inceptor at a target deflection position while also ensuring that the inceptor returns to the neutral position if the operator releases the inceptor.

The haptic system may also provide tactile feedback to an operator to indicate whether a proposed route modification is valid or invalid. For example, a cyclic pulse or vibration, or a shake or other movement of the inceptor may be provided if the operator is holding the inceptor in a position that corresponds to an invalid route. In some cases, the haptic outputs may indicate that the proposed route (as defined by the inceptor position) is valid, or different haptic outputs may be used to indicate valid vs. invalid routes. Other indications of the validity of a proposed route (as determined by the inceptor position) may be provided, including visual cues (e.g., visual indications on a display showing the proposed route and indicating whether it is valid or not), audible cues (e.g., audible alarms, beeps, or tones indicating whether a proposed route as defined by the inceptor is valid or invalid), and the like.

As described herein, an aircraft may be part of an aircraft operation system in which communication is facilitated between the aircraft and ground-based systems. FIG. 12 depicts a schematic of an example onboard system of an aircraft. Portions of the onboard system may include or be referred to as an aircraft computing system and may be programmed or configured to operate in accordance with a set of instructions or settings. As shown in FIG. 12, the onboard system 1200 includes a pair of communication modules 1212, 1213, which may include separate wireless transceivers that are configured to operate at frequencies used by the satellite subsystems, described above with respect to FIG. 1. The transceiver(s) of the communication modules 1212, 1213 may be adapted to conduct Ka-band communications (26-40 GHz), Ku-band communications (12-18 GHz), X-band communications (8-12 GHz), C-band communications (4-8 G Hz), S-band communications (2-4

GHz), L-band communications (1-2 GHz), or other established communication bands. In some cases, the two communication modules 1212, 1213 are configured to operate over different frequency ranges to provide signal diversity for the system 1200.

As shown in FIG. 12, the system 1200 also includes flight management systems 1222, 1223, which correspond to the flight management systems 422, 423 of FIG. 4 (or any other onboard flight management systems described herein). As discussed previously, the flight management systems 1222, 1223 may be operated in tandem to provide increased reliability and redundant verification of operations. As shown in FIG. 12, each of the flight management systems 1222, 1223 are operably coupled to each of the communication modules 1212, 1213. This crossover between communication modules 1212, 1213 may be used to provide redundant communications to each of the flight management systems 1222, 1223 or, alternatively, may be operated in a fail-over condition in which the communication modules 1212, 1213 are each operably coupled to a single flight management system 1222, 1223 until a reliability condition is detected, which may include a failure of service, a reduction in the quality of service, an error rate that exceeds a criteria, or other measure of a change in predicted reliability. Each of the flight management systems 1222, 1223 may be configured to receive and process a flight plan or other flight commands generated by the ground station. For example, the flight management systems 1222, 1223 may receive, store, and display flight plans and may provide flight plan information to a flight controller, an RGMS, or other system(s) of the aircraft (e.g., to allow the RGMS to generate a route based on the flight plan, verify that a currently active route corresponds to or will ultimately result in the flight plan being accomplished, etc.).

As shown in FIG. 12, the system 1200 also includes an onboard aircraft computing system 1230. The aircraft computing system 1230 may include and/or instantiate various computing and other systems that provide flight and other functions described herein. For example, the aircraft computing system 1230 includes, instantiates, or is operably coupled to one or more subsystems including, without limitation, a flight controller 1232 (e.g., corresponding to the flight controller 109 or any other flight controller described herein), a route generation and management system 1233 (e.g., corresponding to the RGMS 111 or any other RGMS described herein), a communication system 1234, aircraft telemetry 1236, and one or more onboard camera systems 1238. The flight controller 1232 is configured to automatically operate one or more of the control systems normally operated by an onboard pilot and may be configured to control various actuators and actuation systems used to modify control surfaces of the aircraft, propulsion systems, landing gear, and other aircraft subsystems, as defined and/or required by a validated route. The communication system 1234, telemetry 1236, and cameras 1238 may be used to provide the system and/or the operator of the ground station with current operating conditions and feedback for commands or controls of the aircraft.

Figure 13:
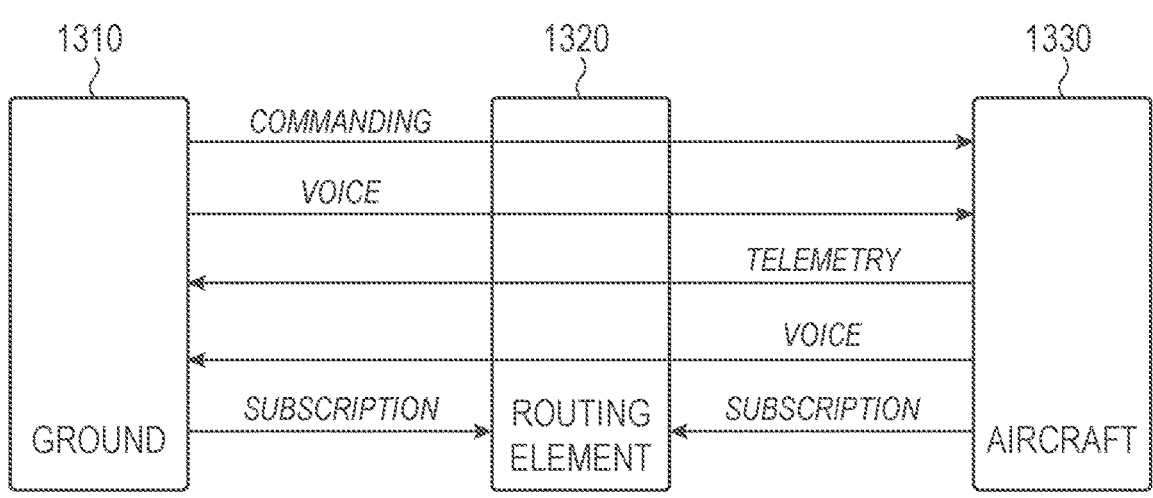
FIG. 13 depicts an example data flow between a ground station and an aircraft.

FIG. 13 depicts an example data flow between the ground station and the aircraft. The example system 1300 is a simplified diagram indicating the subscription-based communication scheme implemented by the communication system of the present disclosure. Specifically, the example system 1300 is a simplified example of the communication system 120 of FIG. 1 and may be used for conducting communication in accordance with the system 1400 of FIG. 14. In the example system 1300 of FIG. 13, each of the ground station 1310 and the aircraft 1330 subscribe to messages handled and verified by the routing element 1320. As shown in the system 1300 of FIG. 13, command instructions, voice communication, sensors and other telemetry data are handled using a subscription scheme for directing data between the ground station 1310 and the aircraft 1330.

In one example implementation, the routing element 1320 publishes data packets to all devices having a current subscription. This allows for a flexible architecture that enables a ground station to monitor and control multiple aircraft and also allows for multiple ground stations to monitor and control the same aircraft using the same network elements. Additionally, the subscriptions may be configured to expire on a relatively short time interval, enabling the network configuration to be modified relatively easily while removing non-active network elements to reduce network traffic.

In one example, the ground station 1310 or the aircraft 1330 (the requesting component) transmit a subscription message request to one or more routing elements 1320. In accordance with the requesting component having authenticated credentials that correspond to a cloud-based registry, the requesting component will receive designated messages (from a specified aircraft and/or ground station) for a predetermined period before the subscription expires. In such an implementation, there is no "unsubscribe" message type or need to expressly unsubscribe from a message or data packet set. In one example, the subscriptions expire a subscription period of 30 seconds or greater. In some cases, the subscriptions expire a subscription period of 60 seconds or greater. In some cases, the subscriptions expire a subscription period of 100 seconds or greater. In some cases, the subscriptions expire a subscription period of 300 seconds or greater. In some cases, the subscriptions expire a subscription period of 500 seconds or greater.

To avoid losing an active subscription, the requesting component may submit multiple redundant subscription requests, which may ensure that the subscription is maintained during active operations. In some cases, the requesting component may transmit a subscription request at 2× the expiration rate or greater. In some cases, the requesting component transmits a subscription request at 3×, 4×, 5× or greater of the expiration rate. For example, if a subscription is set to expire after 300 seconds, the requesting component may send a subscription request every 60 seconds in order to have a 5× request rate. In some cases, message transmissions by the respective component (ground station 1310 or aircraft 1330) are interpreted as a concurrent subscription request, which helps to reduce network traffic that would otherwise be generated simply to maintain the subscription. Having a sufficiently high request/transmission rate of, for example, every 60 seconds for a 300 second expiration, allows for some subscription message drops without losing continuous subscription service.

In some implementations, each of the ground station 1310 and the aircraft 1330 address the routers using statically-configured IP addresses. In some implementations, a domain name system (DNS) can be used to enable redirection of network traffic to alternative routing elements without requiring an update to all network components, individually. In some cases, the DNS registry is maintained on a cloud-based resource similar to the cloud-based registry used to authenticate users and system components.

In one example, a transmission from the ground station 1310 includes a tuple or predefined data element that specifies an aircraft identifier and a communication direction flag. The routing element 1320 may maintain a lookup table of subscribers accessible by the same tuple (e.g., {aircraft identifier, direction flag}). When the routing element 1320 receives a message to be forwarded, the routing element 1320 looks up all subscribers for the given tuple ({aircraft identifier, direction flag}) and sends a copy of the message to each subscriber. While this is provided by way of illustrative example, other subscription techniques and registry systems can be used, depending on the im13plementation.

Figure 14:
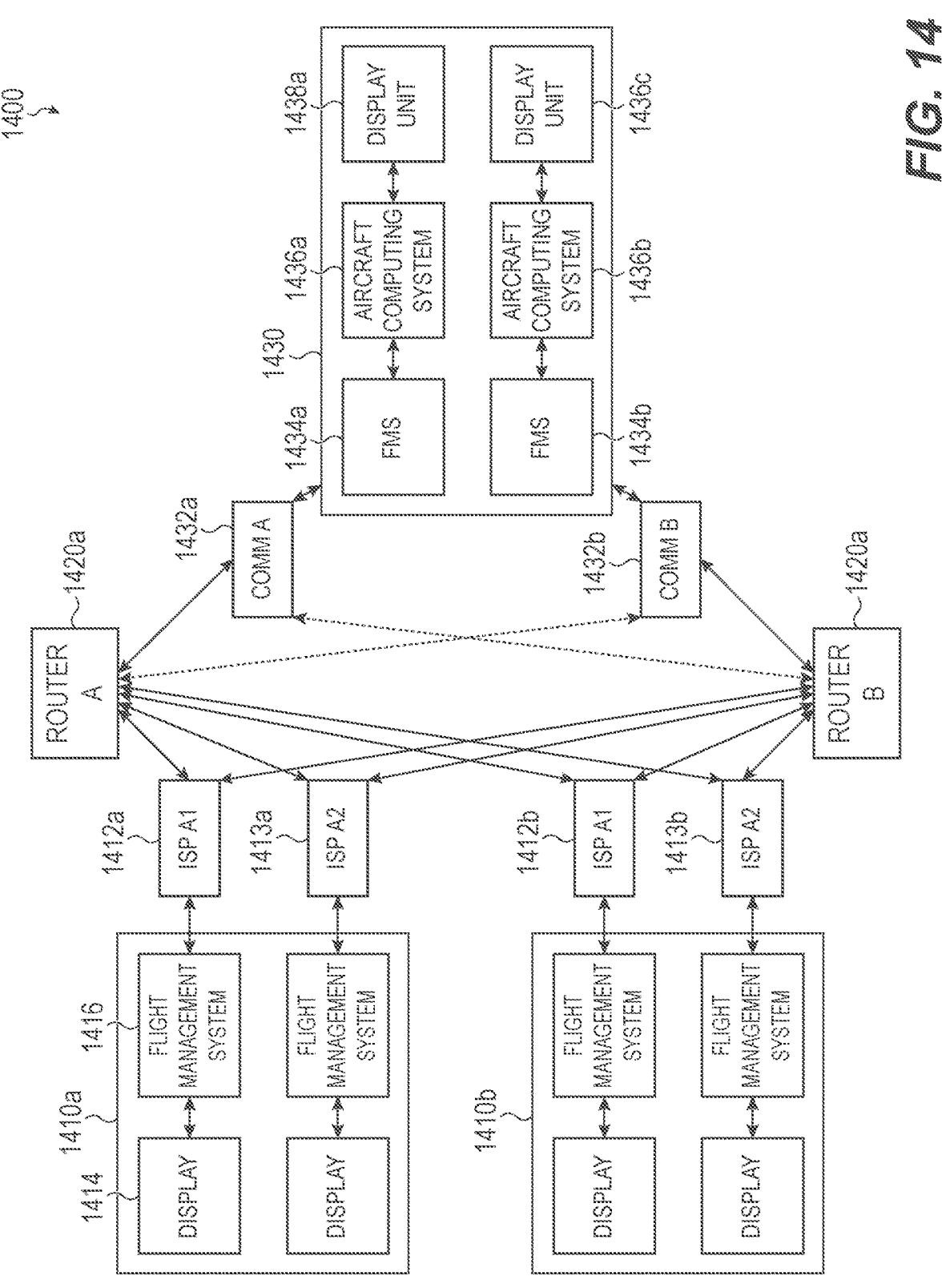
FIG. 14 depicts an example system for communicating with an aircraft from a ground station.

FIG. 14 depicts an example system for communicating with and controlling an aircraft from a ground station. Specifically, FIG. 14 depicts a system 1400 that allows for uninterrupted communication between one or more ground stations 1410a, 1410b and an aircraft 1430. As described herein, the system 1400 provides a robust system in which any one of a number of components can fail or become unreliable without affecting communications between the ground stations 1410a, 1410b and the aircraft 1430. The system 1400 is also extensible allowing for relatively easy expansion to allow for multiple ground stations to manage or control multiple aircraft without having to provision significantly more network resources or alter the primary architecture.

Similar to previous examples, the system 1400 includes a ground station 1410a having at least one display 1414, one or more flight management systems 1416 and other elements described herein with respect to other ground station examples, such as a route generation and management system. As shown in FIG. 14, each ground station may have similar components and a unique item number for each has been omitted. That is, the second ground station 1410b includes substantially similar components to the first ground station 1410a. Also, similar to previous examples, each ground station is operably coupled to redundant internet service providers 1412a, 1413a for ground station 1410a and 1412b, 1413b for ground station 1410b. In some cases, the internet service providers are a combination of hard wired and wireless internet service providers, which allows for a level of communication medium diversity.

Also similar to previous examples, the aircraft 1430 includes a pair of flight management systems 1434a, 1434b, one or more aircraft computing systems 1436a, 1436b, and one or more display units 738a, 738b. The aircraft also includes other various components (e.g., one or more route generation and management systems, flight controllers, etc., which may be part of or instantiated by the aircraft computing systems in some examples), descriptions of which are not repeated for this figure to improve clarity and reduce redundant description. As shown in FIG. 14, the aircraft also includes redundant communication modules 1432a, 1432b. Each of the communication modules 1432a, 1432b is operably coupled to one or both of the routing elements 1420a, 1420b. The connections depicted in dotted lines in FIG. 14 may represent fail-over connections in which the communication modules 1432a, 1432b may be switched between routing elements 1420a, 1420b in response to a reliability condition indicating one of the routing elements 1420a, 1420b may be unable to provide reliable communications.

The system 1400 of FIG. 14 is able to provide ground to air communications for uploading or exchanging routes, flight plans, flight instructions, or other commands directed to the aircraft 1430. The system 1400 is also able to provide air to ground communications including telemetry, camera signals, or other data collected by the aircraft 1430 for access by one of the ground stations 1410a, 1410b. The system 1400 is also able to transmit voice communications between the operator of the ground stations 1410a, 1410b and entities in communication with the aircraft 1430, like air traffic control, other aircraft, or other entities.

The system 1400 may be able to provide at least single-fault reliability in a number of different scenarios. For example, the system 1400 may be able to handle faults on any one of the internet service providers 1412*a*, 1413*a* or 1412*b*, 1413*b*, any one of the communication modules 1432*a*, 1432*b*, any one of the routing elements 1420*a*, 1420*b*, as well as any one of the redundant components or subsystems located within the ground stations 1410*a*, 1410*b* or the aircraft 1430.

The system 1400 may be configured to operate in using a uniform or designated message format that enables versatile use over a range of data types (commands, voice, telemetry) and enables routing for a variety of fault scenarios. In one example implementation, each message includes a header with (a) an aircraft identifier which may use between 16 and 32 bits, (b) a direction flag, which may be accommodated using 1 bit in which [0] designates messages from the aircraft and [1] designates messages from an ground station, and (c) a message type indicating whether the message is to be forwarded or a subscription request, which may be accommodated using 1 to 32 bits.

Telemetry, commanding, and voice messages are all forwarded by the routing elements 1420*a*, 1420*b*. The routing services running on the routing elements 1420*a*, 1420*b* are content-agnostic for these messages and the services do not parse the messages or implement any message-specific handling. This reduces the complexity of the routing services and allows the system 1400 to handle a broad range of data types with little or no changes to the architecture. In general, when the routing elements 1420*a*, 1420*b* receive any message (to be forwarded for subscription), the routing elements 1420*a*, 1420*b* verify that the message signature is valid and that the message was signed by a key referenced in the public key database installed on the router. When receiving a message to be forwarded, the routing elements 1420*a*, 1420*b* additionally verify that the signing key is allowed to send messages of this type per the public key database installed on the router, the message is timely (having a timestamp within a threshold of a current time reference), and that the message is strictly ordered with regards to other messages from the same sender or stream identifier. In some cases, the routing elements 1420*a*, 1420*b* are also configured to ensure that the message is not a duplicate. Once the routing elements 1420*a*, 1420*b* have verified a message to be forwarded, the routing elements 1420*a*, 1420*b* add their own signature in addition to the sender's signature. This provides a faster path for revoking sender credentials that does not require updating senders or receivers.

Figure 15:
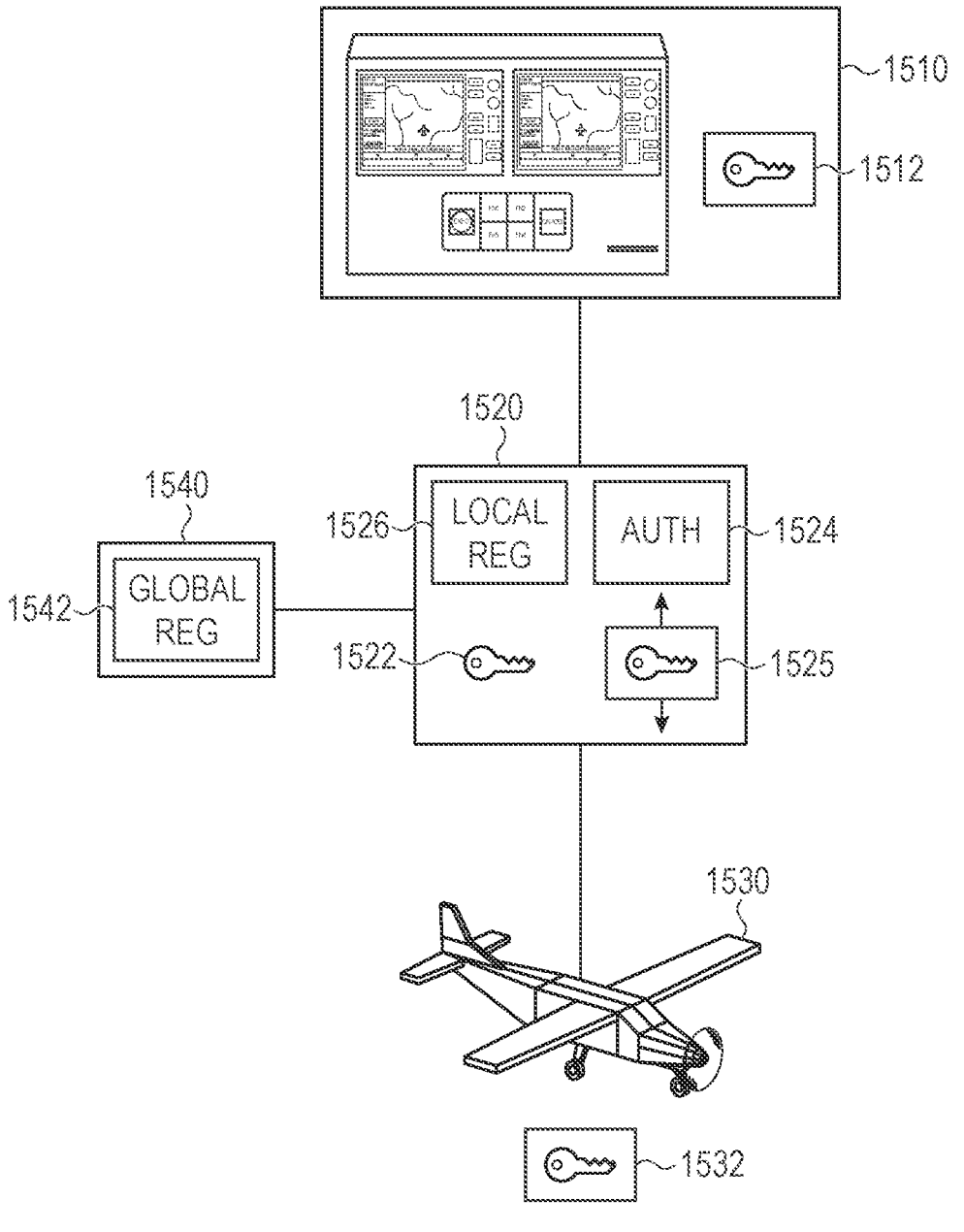
FIG. 15 depicts an example security system for authenticating routes and instructions provided by a ground station to an aircraft.

FIG. 15 depicts an example system for authenticating communications and instructions provided by a ground station to an aircraft. Specifically, the system 1500 of FIG. 15 corresponds to the other communication systems described herein but has been simplified to focus on components and services that may be used to ensure secure communications between a ground station 1510 and an aircraft 1530. As described previously, security may be managed by the routing element 1520 alone or in combination with a cloud-based registry 1540.

The system 1500 of FIG. 15 may be used to implement a passive cryptographic routing scheme in which the routing element 1520 is able to verify signatures and example packets but does not need to modify the contents of packets. This enables a fully stateless protocol, which may be beneficial given the network architecture and the likelihood of lost packets, latency, multiple endpoints, and other system characteristics. Alternatively, the systems described herein may include routing elements and a security scheme in which the routing elements are active cryptographic participants in which session-specific encryption keys or schemes are used to encode packets and packet content.

In the system 1500, each sender has a private key that is used to encrypt transmitted messages. As shown in FIG. 15, the ground station 1510 includes a user private key 1512, which may be stored on an electronic device like a smart card that is inserted or otherwise operably coupled to the ground station 1510. Similarly, the aircraft 1530 includes a private key 1532, which may be stored in non-transitory or non-volatile memory on the aircraft computing system or other onboard system. Each routing element 1520 includes its own key 1522, which is used to add a router signature to packets that are processed by the routing element 1520. A database of public keys is also stored on each of the ground station 1510, routing elements 1520, and the aircraft 1530. The database of public keys may be indexed by sender identifier and key identifier and may allow for multiple public keys to allow for key rotation over time.

In a typical operation, each packet sender (the ground station 1510 or the aircraft 1530) may add a sender signature using the corresponding private key, which may be used to validate messages that are transmitted. In some implementations, the routing element 1520 includes a packet authenticating service that verifies the signature of the sender using a local registry 1526 or similar data store. A global registry 1542 or other similar data store may be stored on a cloud-based registry 1540 and used to revoke authority or update local registries of the various system components.

As data packets 1525 are processed by the routing element 1520, the authorization service 1524 may verify the signature of the sender and perform other checks on the packets including timeliness, duplicate packets, packet order, and packet integrity. Additionally, the routing element 1520 may add a routing signature using the routing element key 1522. The recipient can use both the routing signature and the sending signature to validate received messages ensuring the integrity of the data communication.

Entries in the public key databases may be identified by type. The type determines which message types and signature types will be accepted when signed by the corresponding private key. Example types include aircraft messaging types, which may include telemetry and voice data packets; ground station types, which may include commands and voice packets; and router types, which applies to all messages processed by the routing element.

In some implementations, a nested or multiple header scheme is used for transmitted data packets. A first or inner header may include (a) a sender identifier, which may be accommodated using 32 bits, (b) a sender key identifier, which may be accommodated using 8 bits and may also identify a specific public/private key pair associated with the sender identifier, (c) a stream identifier, which may be accommodated using 8 bits, and (d) a timestamp, which may be accommodated using 64 bits and referenced using a universal or synchronized time reference. A second or outer header may include, (a) a sender signature, which may be accommodated using 512 bits and may sign the full message body and the first or inner header, (b) a router identifier, which may be accommodated using 32 bits, (c) a router key identifier, which may be accommodated using 8 bits and may include an identifier of a specific public/private key pair associated with the router, and (d) a router signature, which may be accommodated using 32 bits and may sign the full message body and the first or inner header.

The system 1500 may also maintain multiple keys for each sender, which may allow for older keys to be phased out and replaced with new keys without interrupting service. The cloud-based registry 1540 may also be used to quickly and efficiently revoke access to a user or operator that is no longer authorized by denying access at the router without requiring that all of the public databases at every component of the system be updated to reflect the revoked access. The system 1500 may also include additional security features that may vary depending on the implementation.

FIG. 16 is a flow chart depicting an example method 1600 of generating and traversing validated routes. At operation 1602, an aircraft may be caused to traverse a primary trajectory defined by a validated primary route. For example, a primary route for an aircraft may be received (e.g., by an onboard or ground based RGMS), the primary route defining a primary trajectory, for the aircraft, from an origin location to a destination location. The primary route may include taxiing, takeoff, and landing operations, as well as flight operations. The primary route may be validated. For example, an RGMS may generate a validated route by generating a route, from a flight plan, that satisfies a set of validation criteria, as described herein. The validated primary route may be provided to a flight controller of the aircraft, which controls aircraft systems in order to traverse the validated primary route. For example, the flight controller may control flight control surfaces, a propulsion system, landing gear, brakes, flaps, and any other suitable aircraft systems in order to execute operations such as taxiing, takeoff, landing, and flight from an origin to a destination location (as defined by the validated primary route).

At operation 1604, while the aircraft is traversing the primary trajectory, an input from an inceptor may be received, corresponding to a request for a deviation from the validated primary route. The input may include a direction and a magnitude, which are indicative of a direction of a requested change in trajectory and a magnitude of the requested change in trajectory.

The input may be mapped to a predetermined flight maneuver. Predetermined flight maneuvers may include, for example, constant radius turns, constant rate ascents, and constant rate descents. The particular magnitude and distance of the input may be mapped to a particular predetermined maneuver having a direction (e.g., left turn, right turn, ascent, descent) and magnitude (e.g., turn radius, ascent rate, descent rate). More particularly, in the case of a turn, a direction of the turn may be defined by the manipulation direction (e.g., a leftward manipulation indicates a left hand turn, and a rightward manipulation indicates a right hand turn), and a radius of the turn may be defined by the manipulation distance (e.g., a greater lateral manipulation distance correlates to a smaller radius turn). As another example, in the case of an ascent/descent, a direction of the change in altitude may be defined by the manipulation direction (e.g., forward for descent, aft for ascent or climb), and a climb rate may be defined by the manipulation distance (e.g., greater forward manipulation correlates to greater descent rate, and greater rearward manipulation correlates to greater ascent rate). As described with respect to FIG. 11, certain inputs to the inceptor may map to certain predetermined flight maneuvers.

At operation 1606, a modified route is computed. The modified route may define a modified trajectory for the aircraft. The modified route may initiate the predetermined flight maneuver at a first location in the primary route and resume a portion of the primary route at a second location in the primary route. The first and second locations may be the same or substantially the same (e.g., in the case of a constant radius turn), or they may be different (e.g., in the case of an ascent/descent, in which case the second location may be further along the primary route than the first location). The modified route may include parameters of the turn or ascent/descent indicated by the manipulation of the inceptor.

At operation 1608, the modified route is validated. For example, an RGMS may validate the modified route by determining whether the modified route satisfies a set of validation criteria, as described herein (e.g., whether the aircraft is capable of performing the requested maneuver given current or predicted environmental or other conditions, whether the modified route intersects known obstacles, etc.).

If the modified route is determined to be valid, at operation 1610 the modified route may be provided to the flight controller of the aircraft (or other suitable flight control system(s)) to cause the aircraft to autonomously traverse the modified trajectory defined by the modified route. Autonomously traversing the modified trajectory (and/or route) may include controlling aircraft systems such as flight control surfaces, a propulsion system, landing gear, flaps, and any other suitable aircraft systems in order to cause the aircraft to traverse the modified trajectory. In some cases, the aircraft may continuously adjust its systems and flight parameters in order to maintain the aircraft on the validated modified trajectory.

After traversing the modified trajectory at operation 1610 (and optionally after traversing secondary or additional modified trajectories, including additional turns, altitude changes, straight flight segments, etc.), at operation 1611, the aircraft may return to the primary trajectory (e.g., at the second location along the primary route). For example, absent an override of the validated route system or full manual takeover of the aircraft, the aircraft will ultimately return from any and all modified routes to the primary route.

If the modified route is determined not to be valid, at operation 1612 the modified route is disregarded. In such cases, the aircraft may continue to traverse the primary trajectory of the validated primary route.

The operations of method 1600 may be repeated and/or applied to multiple route modifications. For example, a request for a second modified route may be received while the aircraft is traversing a first modified route. In such cases, the operations 1604-1612 may be performed for the second modified route. Second modified routes may result from various operator inputs. For example, returning an inceptor to a neutral position (from a manipulated position) may result in a request to generate a second modified route (e.g., corresponding to straight and level flight). As another example, increasing or decreasing the manipulation magnitude (or changing manipulation direction) of an inceptor may result in a request to generate a second modified route.

FIG. 17 illustrates a sample electrical block diagram of an electronic device 1700 that may perform the operations described herein. The electronic device 1700 may in some cases take the form of any of the electronic devices described with reference to FIGS. 1-16, including any computing systems, flight controllers, route generation and management systems, ground-based computing systems, aircraft-based or onboard computing systems, client devices, servers, or other computing devices associated with the systems described herein and/or used for implementing the techniques described herein. The electronic device 1700 can include one or more of a display 1708, a processing unit 1702, a power source 1712, a memory 1704 or storage device, input devices 1706, and output devices 1710. In some cases, various implementations of the electronic device 1700 may lack some or all of these components and/or include additional or alternative components.

The processing unit 1702 can control some or all of the operations of the electronic device 1700. The processing unit 1702 can communicate, either directly or indirectly, with some or all of the components of the electronic device 1700. For example, a system bus or other communication mechanism 1714 can provide communication between the processing unit 1702, the power source 1712, the memory 1704, the input device(s) 1706, and the output device(s) 1710.

The processing unit 1702 can be implemented as any electronic device capable of processing, receiving, or transmitting data or instructions. For example, the processing unit 1702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1700 can be controlled by multiple processing units. For example, select components of the electronic device 1700 (e.g., an input device 1706) may be controlled by a first processing unit and other components of the electronic device 1700 (e.g., the display 1708) may be controlled by a second processing unit, where the first and second processing units may or may not be in communication with each other.

The power source 1712 can be implemented with any device capable of providing energy to the electronic device 1700. For example, the power source 1712 may be one or more batteries or rechargeable batteries. Additionally or alternatively, the power source 1712 can be a power connector or power cord that connects the electronic device 1700 to another power source, such as a wall outlet or a power system of the aircraft.

The memory 1704 can store electronic data that can be used by the electronic device 1700. For example, the memory 1704 can store electronic data or content such as, for example, audio files, video files, voice communication packets, documents and applications, device settings and user preferences, computer instructions, timing signals, control signals, and data structures or databases. The memory 1704 can be configured as any type of memory. By way of example only, the memory 1704 can be implemented as random access memory, read-only memory, Flash memory, removable memory, other types of storage elements, or combinations of such devices.

In various embodiments, the display 1708 provides a graphical output, for example associated with an operating system, user interface, and/or applications of the electronic device 1700. For example, the display 1708 may display graphical user interfaces associated with the flight management systems, flight controllers, route generation and management systems, or any other graphical user interfaces or other graphical outputs described herein. In one embodiment, the display 1708 includes one or more sensors and is configured as a touch-sensitive (e.g., single-touch, multi-touch) and/or force-sensitive display to receive inputs from a user. For example, the display 1708 may be integrated with a touch sensor (e.g., a capacitive touch sensor) and/or a force sensor to provide a touch- and/or force-sensitive display. The display 1708 is operably coupled to the processing unit 1702 of the electronic device 1700. Additionally or alternatively, the display 1708 may include one or more bezel buttons or other input devices that are arranged along the perimeter of the viewable display area.

The display 1708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology.

In various embodiments, the input devices 1706 may include any suitable components for detecting inputs. For example, the input device 1706 may include a keyboard, mouse, trackpad, or other similar type of input device configured to receive typing, cursor control, or other user input. In some cases, an input device may be an inceptor or other input system that can receive directional inputs, such as a directional pad, thumbstick, or the like. In some cases, a separate tablet or other portable electronic device may include a touch screen or touch sensor that can be adapted for use as an input device 1706 for the device 1700. Other examples of input devices 1706 include, without limitation, gaming controllers, light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), airspeed sensors, altimeters, accelerometers, tilt sensors, radar sensors, LiDAR sensors, vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, or electrodes. Each input device 1706 may be configured to detect one or more particular types of input and provide a signal (e.g., an input signal) corresponding to the detected input. The signal may be provided, for example, to the processing unit 1702.

As discussed above, in some cases, the input device(s) 1706 include a touch sensor (e.g., a capacitive touch sensor) integrated with the display 1708 to provide a touch-sensitive display. Similarly, in some cases, the input device(s) 1706 include a force sensor (e.g., a capacitive force sensor) integrated with the display 1708 to provide a force-sensitive display. Additionally or alternatively, the input device(s) 1706 may include a separate trackpad, mouse, tablet, or other device configured to receive touch and/or force input from the user.

The output devices 1710 may include any suitable components for providing outputs. Examples of output devices 1710 include, without limitation, light emitters, audio output devices (e.g., speakers), visual output devices (e.g., lights or displays), tactile output devices (e.g., haptic output devices), and communication devices (e.g., wired or wireless communication devices). Each output device 1710 may be configured to receive one or more signals (e.g., an output signal provided by the processing unit 1702) and provide an output corresponding to the signal.

In some cases, input devices 1706 and output devices 1710 are implemented together as a single device. For example, an input/output device or port can transmit electronic signals via a communications network, such as a wireless and/or wired network connection. Examples of wireless and wired network connections include, but are not limited to, the example communication systems described herein and include, without limitation, satellite communication systems, cellular systems, Wi-Fi, Bluetooth, IR, or Ethernet connections.

The processing unit 1702 may be operably coupled to the input devices 1706 and the output devices 1710. The processing unit 1702 may be adapted to exchange signals with the input devices 1706 and the output devices 1710. For example, the processing unit 1702 may receive an input signal from an input device 1706 that corresponds to an input detected by the input device 1706. The processing unit 1702 may interpret the received input signal to determine whether to provide and/or change one or more outputs in response to the input signal. The processing unit 1702 may then send an output signal to one or more of the output devices 1710, to provide and/or change outputs as appropriate.

Unless otherwise stated, the terms "include" and "comprise" (and variations thereof such as "including," "includes," "comprising," "comprises," "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method of autonomous flight for an aircraft, the method comprising:

receiving, from a ground station and at an aircraft computing system onboard the aircraft, a primary route, the primary route defining a primary trajectory, for the aircraft, from an origin location to a destination location;

causing the aircraft to autonomously traverse the primary trajectory defined by the primary route using a flight controller, the flight controller configured to automatically control a set of flight control surfaces of the aircraft;

while the aircraft is autonomously traversing the primary trajectory, receiving an input from an inceptor, the input including a direction and a magnitude;

automatically mapping the direction and magnitude of the input to a predetermined flight maneuver;

computing, based on the input, a modified route, the modified route configured to cause the aircraft to:

initiate the predetermined flight maneuver at a predetermined first location along the primary route;

resume a portion of the primary route by rejoining the primary route at a predetermined second location along the primary route, the modified route defining a modified trajectory for the aircraft; and validating the modified route, including determining whether the modified route intersects known obstacles;

in response to the validation of the modified route failing, disregarding the input from the inceptor and maintaining the primary route; and in response to the validation of the modified route succeeding, causing the aircraft to autonomously traverse the modified trajectory using the flight controller.

2. The method of claim 1, wherein:

a direction of the predetermined flight maneuver corresponds to the direction of the input; and a distance of the predetermined flight maneuver corresponds to the magnitude of the input.

3. The method of claim 2, wherein:

the predetermined flight maneuver corresponds to a turn;

a direction of the turn is defined by the direction of the input; and a radius of the turn is defined by the magnitude of the input.

4. The method of claim 3, wherein the turn is a constant radius turn.

5. The method of claim 2, wherein:

the predetermined flight maneuver corresponds to a change in altitude;

a direction of the change in altitude is defined by the direction of the input; and a climb rate is defined by the magnitude of the input.

6. The method of claim 1, wherein:

the modified route is a first modified route;

the modified trajectory is a first modified trajectory;

the input is a first input; and the method further comprises:

while the aircraft is autonomously traversing the first modified trajectory, receiving a second input from the inceptor, the second input corresponding to the inceptor being returned to a neutral position;

computing a second modified route corresponding to straight and level flight, the second modified route defining a second modified trajectory for the aircraft;

validating the second modified route, including determining whether the second modified route intersects known obstacles;

in response to the validation of the second modified route failing, disregarding the second input from the inceptor and maintaining the first modified route; and in response to the validation of the second modified route succeeding, causing the aircraft to autonomously traverse the second modified trajectory using the flight controller.

7. The method of claim 6, further comprising:

while the aircraft is autonomously traversing the second modified trajectory and in accordance with a determination that no manipulations of the inceptor are detected for a time duration:

generating a third modified route corresponding to a return to the primary route, the third modified route defining a third modified trajectory for the aircraft;

validating the third modified route, including determining whether the third modified route intersects known obstacles;

in response to the validation of the third modified route failing, maintaining the second modified route; and in response to the validation of the third modified route succeeding, causing the aircraft to autonomously traverse the third modified trajectory using the flight controller.

8. A method comprising, at a route generation system onboard an aircraft and configured to generate validated routes for autonomous flight:

while an aircraft is autonomously traversing a primary trajectory from an origin location to a destination location, the primary trajectory defined by a primary route:

receiving an input from an inceptor, the input including a direction and a magnitude;

automatically mapping the direction and magnitude of the input to a predetermined flight maneuver;

computing, based on the input, a modified route, the modified route configured to cause the aircraft to:

initiate the predetermined flight maneuver at a predetermined first location along the primary route resume a portion of the primary route by rejoining the primary route at a second location along the primary route, the modified route defining a modified trajectory for the aircraft; and validating the modified route, including determining whether the modified route intersects known obstacles;

in response to the validation of the modified route failing, disregarding the input from the inceptor and maintaining the primary route; and in response to the validation of the modified route succeeding, causing the aircraft to autonomously traverse the modified trajectory using a flight controller, wherein the flight controller is configured to manipulate a propulsion system of the aircraft and a flight control surface of the aircraft in order to autonomously traverse the modified trajectory.

9. The method of claim 8, wherein:

the predetermined flight maneuver includes a constant radius turn; and the flight controller is configured to adjust a bank angle of the aircraft to maintain the constant radius turn while traversing the modified route.

10. The method of claim 8, wherein:

the predetermined flight maneuver includes a 360 degree turn having a radius that corresponds to the magnitude of the input; and validating the modified route includes determining whether the aircraft can perform the 360 degree turn without intersecting known obstacles.

11. The method of claim 8, wherein the modified route fails the validation if the modified route intersects a known obstacle.

12. The method of claim 8, wherein validating the modified route includes determining whether the aircraft is capable of traversing the modified trajectory under current environmental conditions.

13. The method of claim 8, wherein:

the modified route is a first modified route;

the modified trajectory is a first modified trajectory;

the input is a first input; and the method further comprises:

while the aircraft is autonomously traversing the first modified trajectory, receiving a second input from the inceptor, the second input corresponding to the inceptor being returned to a neutral position;

computing a second modified route corresponding to straight and level flight, the second modified route defining a second modified trajectory for the aircraft;

validating the second modified route, including determining whether the second modified route intersects known obstacles;

in response to the validation of the second modified route failing, disregarding the second input from the inceptor and maintaining the first modified route; and in response to the validation of the second modified route succeeding, causing the aircraft to autonomously traverse the second modified trajectory using the flight controller.

14. The method of claim 8, further comprising, after traversing at least a portion of the modified trajectory, causing the aircraft to return to the primary trajectory.

15. An aircraft comprising:

a propulsion system;

a set of flight control surfaces;

a flight controller operatively coupled to the propulsion system and the set of flight control surfaces;

an inceptor; and an aircraft computing system configured to:

receive, from a ground station, a primary route, the primary route defining a primary trajectory, for the aircraft, from an origin location to a destination location;

cause the aircraft to autonomously traverse the primary trajectory using the flight controller, the flight controller configured to automatically control the set of flight control surfaces of the aircraft and the propulsion system of the aircraft to traverse the primary trajectory;

while the aircraft is autonomously traversing the primary trajectory, receive an input from the inceptor, the input including a direction and a magnitude;

automatically map the direction and magnitude of the input to a predetermined flight maneuver;

compute, based on the input, a modified route, the modified route configured to cause the aircraft to:

initiate the predetermined flight maneuver at a first location along the primary route;

resume a portion of the primary route by rejoining the primary route at a predetermined second location along the primary route, the modified route defining a modified trajectory for the aircraft; and validate the modified route, including determining whether the modified route intersects known obstacles;

in response to the validation of the modified route failing, disregard the input from the inceptor and maintain the primary route; and in response to the validation of the modified route succeeding, cause the aircraft to autonomously traverse the modified trajectory using the flight controller.

16. The aircraft of claim 15, wherein:

the inceptor comprises a base and a stick member movable relative to the base; and the stick member is movable between a neutral position and a set of deflection positions, wherein:

a first deflection position of the set of deflection positions is associated with a first manipulation distance and first tactile feedback; and a second deflection position of the set of deflection positions is associated with a second manipulation distance and second tactile feedback.

17. The aircraft of claim 16, wherein:

the inceptor includes a haptic actuator; and the haptic actuator produces the first tactile feedback and the second tactile feedback.

18. The aircraft of claim 16, wherein:

the first deflection position corresponds to a request to execute a first predetermined flight maneuver corresponding to a first turn having a first radius; and the second deflection position corresponds to a request to execute a second predetermined flight maneuver corresponding to a second turn having a second radius that is smaller than the first radius.

19. The aircraft of claim 16, wherein:

the set of deflection positions corresponds to a set of first deflection positions in a first direction relative to the neutral position; and the stick member is movable between the neutral position and a set of second deflection positions in a second direction relative to the neutral position, the second direction different from the first direction.

20. The aircraft of claim 19, wherein the set of second deflection positions includes:

a third deflection position corresponding to a request to execute a third predetermined flight maneuver corresponding to a first climb at a first climb rate; and a fourth deflection position corresponds to a request to execute a fourth predetermined flight maneuver corresponding to a second climb at a second climb rate different from the first climb rate.

* * * * *